US012672755B2

(12) United States Patent
Kang et al.

(10) Patent No.: US 12,672,755 B2
(45) Date of Patent: Jul. 7, 2026

(54) DISHWASHER PROVIDING NOTIFICATION FOR REPLACING FILTER AND METHOD OF PROVIDING A NOTIFICATION FOR REPLACING A FILTER

(71) Applicant: LG ELECTRONICS INC., Seoul (KR)

(72) Inventors: Hoseok Kang, Seoul (KR); Sang Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 662 days.

(21) Appl. No.: 18/116,133

(22) Filed: Mar. 1, 2023

(65) Prior Publication Data

US 2023/0277033 A1     Sep. 7, 2023

(30) Foreign Application Priority Data

Mar. 4, 2022     (KR) ........................ 10-2022-0028418

(51) Int. Cl.

| | |
|---|---|
| *A47L 15/42* | (2006.01) |
| *A47L 15/00* | (2006.01) |
| *A47L 15/46* | (2006.01) |
| *A47L 15/48* | (2006.01) |
| *B01D 46/00* | (2022.01) |

(52) U.S. Cl.
CPC ....... *A47L 15/4293* (2013.01); *A47L 15/0034* (2013.01); *A47L 15/0063* (2013.01); *A47L 15/46* (2013.01); *A47L 15/486* (2013.01); *B01D 46/0086* (2013.01); *A47L 2401/20* (2013.01); *A47L 2401/22* (2013.01); *A47L 2501/26* (2013.01); *B01D 2279/55* (2013.01)

(58) Field of Classification Search
CPC ............. A47L 15/4293; A47L 15/0034; A47L 15/0063; A47L 15/46; A47L 15/486; A47L 2401/20; A47L 2401/22; A47L 2501/26; A47L 15/0049; A47L 15/0057; A47L 2401/34; B01D 46/0086; B01D 2279/55
See application file for complete search history.

(56) References Cited

U.S. PATENT DOCUMENTS

| | | | |
|---|---|---|---|
| 2013/0104935 A1* | 5/2013 | Gnadinger | .......... A47L 15/0049 134/110 |
| 2017/0341001 A1* | 11/2017 | Jousma | .............. B01D 46/0086 |
| 2018/0193500 A1* | 7/2018 | Safavi | ..................... B01L 9/543 |

FOREIGN PATENT DOCUMENTS

| | | | | |
|---|---|---|---|---|
| CN | 108209828 A | 6/2018 | | |
| CN | 209789798 U | 12/2019 | | |
| EP | 3501368 A1 * | 6/2019 | ......... | A47L 15/4276 |
| JP | 2002-301000 A | 10/2002 | | |
| WO | WO 2021/251871 | 12/2021 | | |

OTHER PUBLICATIONS

Extended European Search Report in European Appln. No. 23158930.0, mailed on Jul. 21, 2023, 8 pages.

* cited by examiner

*Primary Examiner* — David J Laux

(74) *Attorney, Agent, or Firm* — Fish & Richardson P.C.

(57)     ABSTRACT

A dishwasher performs a method for providing a notification for replacing a filter. The dishwasher continues to accumulate operation time of an air blowing fan of the dishwasher, and when total accumulative operation time is predetermined time or greater, outputs a notification for replacing a filter through a display or a speaker to determine the timing of the replacement of the filter accurately.

18 Claims, 16 Drawing Sheets

DISHWASHER PROVIDING NOTIFICATION FOR REPLACING FILTER AND METHOD OF PROVIDING A NOTIFICATION FOR REPLACING A FILTER

CROSS-REFERENCE TO RELATED APPLICATION

This application claims priority to and the benefit of Korean Patent Application No. 10-2022-0028418, filed on Mar. 4, 2022, the disclosure of which is incorporated herein by reference in its entirety.

TECHNICAL FIELD

Disclosed herein are a dishwasher and a method for providing a notification for replacing a filter.

BACKGROUND

Ordinarily, dishwashers spray high-pressure wash water to tableware to remove food or contaminants attached to tableware and wash tableware, after meals. Dishwashers operate based on steps such as a washing step, a rinsing step and a drying step, to wash tableware.

In the drying step, dishwashers filter external air through a filter and dry tableware therein.

As a related art, a filter device for an industrial dust collector is disclosed in International Patent Publication No. WO 2021/251871 A1, and in the disclosure, the state of a filter is detected and displayed, to prevent the extraction of dust, if the filter is not in place.

However, in the related art, the state of a filter and the amount of dust absorbed into the filter are merely displayed, and the related art does not disclose notifying a notification for replacing the filter based on time of use of the filter or the number of times of use of the filter, making it hard for the user to know that the filter needs to be replaced intuitively.

Additionally, in the related art, a notification for replacing a filter is not transmitted to a mobile terminal.

To solve the problem, a notification for replacing a filter needs to be provided to allow the user to know that the filter purifying air needs to be replaced, intuitively, thus, a dishwasher dries tableware by using non-contaminated air.

SUMMARY

Technical Problems

In the related art, the state of a filter, and the amount of dust absorbed into the filter are merely displayed, and the related art does not disclose notifying a notification for replacing the filter based on time of use of the filter or the number of times of use of the filter, making it hard for the user to know that the filter needs to be replaced intuitively.

The present disclosure relates to a dishwasher providing a notification for replacing a filter, and a method of providing a notification for replacing a filter.

Additionally, the present disclosure relates to a dishwasher and a method in which based on time for which an air blowing fan operates, replacement of a filter is determined, and when it is determined that the filter needs to be replaced, a notification for replacing a filter is displayed on a display in an on/off (ON/OFF) manner/mode.

Further, the present disclosure relates to a dishwasher and a method in which based on the number of operation times of an air blowing fan, replacement of a filter is determined, and when it is determined that the filter needs to be replaced, a notification for replacing a filter is displayed on a display, in an on/off (ON/OFF) manner/mode.

Further, the present disclosure relates to a dishwasher and a method in which when a filter is replaced in the state where a notification for replacing a filter is displayed on a display, the displayed notification is canceled.

Furthermore, the present disclosure relates to a dishwasher and a method in which a notification for replacing a filter is displayed on a display and provided to a mobile terminal, and based on receipt of a signal of canceling a notification from the mobile terminal, the notification displayed on the display is canceled.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A dishwasher according to the present disclosure may continue to accumulate time for which an air blowing fan operates, and determine whether the accumulative operation time is a predetermined time or greater, as a drying process based on the air blowing fan starts, during a procedure.

According to the present disclosure, when the accumulative operation time is predetermined time or greater, a notification for replacing a filter may be output on a display of the dishwasher.

According to the present disclosure, when it is identified that the filter is replaced, after the notification for replacing a filter is output on the display of the dishwasher, the accumulative operation time may be initialized, and the notification may be canceled.

According to the present disclosure, when it is identified that the dishwasher is currently performing a drying process, a notification may be continuously displayed in an on (ON) manner/mode, on the display, during the drying process.

According to the present disclosure, when it is identified that the dishwasher is not currently performing a drying process, and the total accumulative operation time is the predetermined time or greater, the notification may be repeatedly displayed on the display in an on/off (ON/OFF) manner/mode.

According to the present disclosure, when the initialization of the total accumulative operation time is detected, based on the replacement of the filter, the total operation time accumulated in a memory may be initialized to 0.

According to the present disclosure, the dishwasher may count and accumulate the number of drying processes that are performed by the dishwasher, based on an operation of the air blowing fan, and when the counted number is the number of predetermined times or greater, the dishwasher outputs a notification for replacing a filter through the display.

According to the present disclosure, a notification for replacing a filter may be output through a speaker of the dishwasher.

According to the present disclosure, in the state where a notification is repeatedly displayed through the display in an on/off (ON/OFF) manner/mode, the notification may also be output through the speaker after predetermined time passes.

According to the present disclosure, when total accumulative operation time of a filter is predetermined time or greater, information on the replacement of the filter may be transmitted through a communication device to at least one mobile terminal.

According to the present disclosure, in the case where the dishwasher is currently performing a drying process that is based on the operation of the air blowing fan, or the dishwasher is currently performing a procedure that is not based on the operation of the air blowing fan, the display may be controlled to display a notification in a different manner.

According to the present disclosure, the number of times based on the operations of the air blowing fan may be accumulated, and when the number of accumulative times is the number of predetermined times or greater, a notification for replacing a filter may be output through the display, and information on the replacement of the filter may be transmitted to at least one mobile terminal.

According to the present disclosure, when the replacement of the filter, or a signal of a request for canceling a notification from a mobile terminal is identified, the notification display on the display may be canceled.

According to the present disclosure, as the number of accumulative times regarding the operations of the air blowing fan increases, the notification may become red gradually.

Advantageous Effects

According to the present disclosure, as a drying process based on an air blowing fan starts, during a procedure of a dishwasher, time for which the air blowing fan operates may be accumulated continuously, and it is determined whether the accumulative operation time is predetermined time or greater, thereby determining a timing of replacing a filter accurately.

According to the present disclosure, when the accumulative operation time is the predetermined time or greater, the dishwasher outputs a notification for replacing a filter on a display of the dishwasher, thereby allowing a user to know that the filter needs to be replaced intuitively.

According to the present disclosure, when it is identified that the filter is replaced after the notification for replacing a filter is output on the display of the dishwasher, the accumulative operation time may be initialized, and the notification may be canceled, thereby allowing the user to know results of the replacement of the filter each time the filter is replaced.

According to the present disclosure, when it is identified that the dishwasher is currently performing a drying process, a notification may be continuously displayed in an on (ON) manner, through the display, during the drying process, thereby differentiating notifications to be displayed depending on whether the drying process proceeds.

According to the present disclosure, when it is identified that the dishwasher is not currently performing a drying process, and total accumulative operation time is the predetermined time or greater, the notification may be repeatedly output and displayed on the display in an on/off (ON/OFF) manner/mode, thereby allowing the user to know that a filter needs to be replaced regardless of an operation of the dishwasher.

According to the present disclosure, the dishwasher may count and accumulate the number of drying processes that are performed by the dishwasher, based on an operation of the air blowing fan, and when the counted number is the number of predetermined times or greater, the dishwasher outputs a notification for replacing a filter through the display, thereby a user know that the filter needs to be replaced intuitively.

According to the present disclosure, a notification for replacing a filter may be output through a speaker of the dishwasher, thereby allowing the user far away from the dishwasher to know that the filter needs to be replaced in real time.

According to the present disclosure, in the state where a notification is repeatedly displayed through the display in an on/off (ON/OFF) manner/mode, the notification may also be output through the speaker after predetermined time passes, thereby allowing the user far away from the dishwasher to know that the filter needs to be replaced in real time.

According to the present disclosure, when the total accumulative operation time of a filter is predetermined time or greater, information on the replacement of the filter may be transmitted through a communication device to at least one mobile terminal, thereby making the user aware of the need to replace the filter.

According to the present disclosure, in the case where the dishwasher is currently performing a drying process that is based on the operation of the air blowing fan, or the dishwasher is currently performing a procedure that is not based on the operation of the air blowing fan, a notification may be displayed in a different manner, thereby differentiating notifications may be displayed depending on whether the drying process proceeds.

According to the present disclosure, the number of times based on the operations of the air blowing fan may be accumulated, and when the number of accumulative times is the number of predetermined times or greater, a notification for replacing a filter may be output through the display, and information on the replacement of the filter may be transmitted to at least one mobile terminal, thereby allowing the user who is near the dishwasher or not to know that the filter needs to be replaced.

According to the present disclosure, as the number of accumulative times regarding the operations of the air blowing fan increases, a notification may become red gradually, thereby allowing the user to know a timing of replacing a filter.

Specific effects are described along with the above-described effects in the section of detailed description.

BRIEF DESCRIPTION OF DRAWINGS

The accompanying drawings constitute a part of the specification, illustrate one or more embodiments in the disclosure, and together with the specification, explain the disclosure.

DETAILED DESCRIPTION

Figure 1:
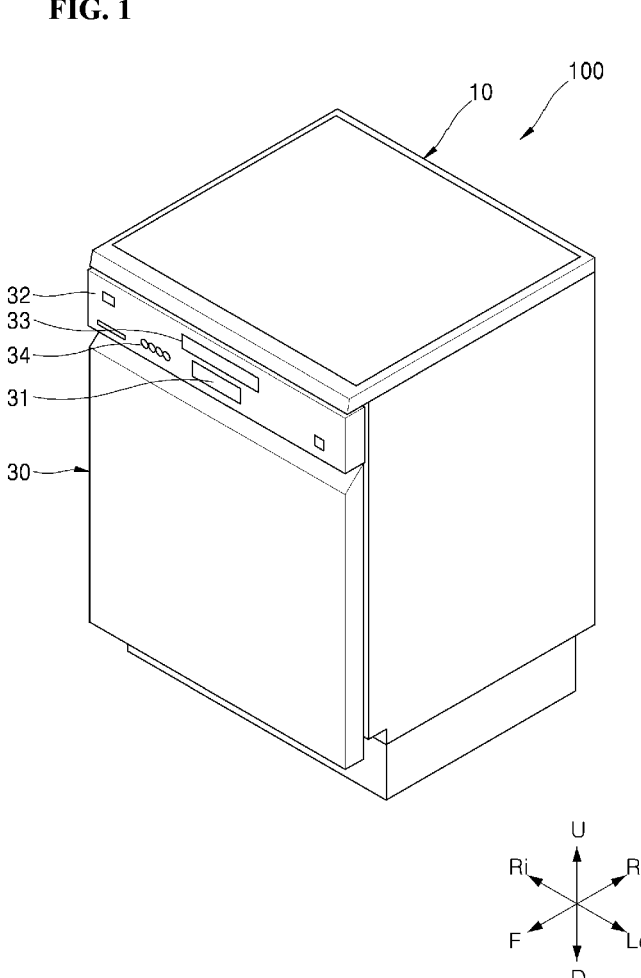
FIG. 1 is a front perspective view showing a dishwasher of one embodiment.

The above-described aspects, features and advantages are specifically described hereafter with reference to the accompanying drawings such that one having ordinary skill in the art to which the present disclosure pertains can embody the technical spirit of the disclosure easily. In the disclosure, detailed description of known technologies in relation to the disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component, unless stated to the contrary.

When any one component is described as being "at the upper part (or lower part)" or "on (or under)" another component, any one component can be directly on (or under) another component, but an additional component can be interposed between any one component and another component on (or under) any one component.

When any one component is described as being "connected", "coupled", or "connected" to another component, any one component can be directly connected or coupled to another component, but an additional component can be "interposed" between the two components or the two components can be "connected", "coupled", or "connected" by an additional component.

Throughout the disclosure, each component can be provided as a singular or a plurality, unless stated to the contrary.

Throughout the disclosure, the singular forms "a", "an" and "the" are intended to include the plural forms as well, unless explicitly indicated otherwise. It is to be understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the phrase "A and/or B" as used herein can denote A, B or A and B, and the phrase "C to D" can denote C or greater and D or less, unless stated to the contrary.

Hereafter, a dishwasher and a method of several embodiments of the present disclosure are described.

[Entire Structure of Dishwasher]

Hereafter, the entire structure of a dishwasher 100 of one embodiment is described specifically with reference to the accompanying drawings.

Figure 2:
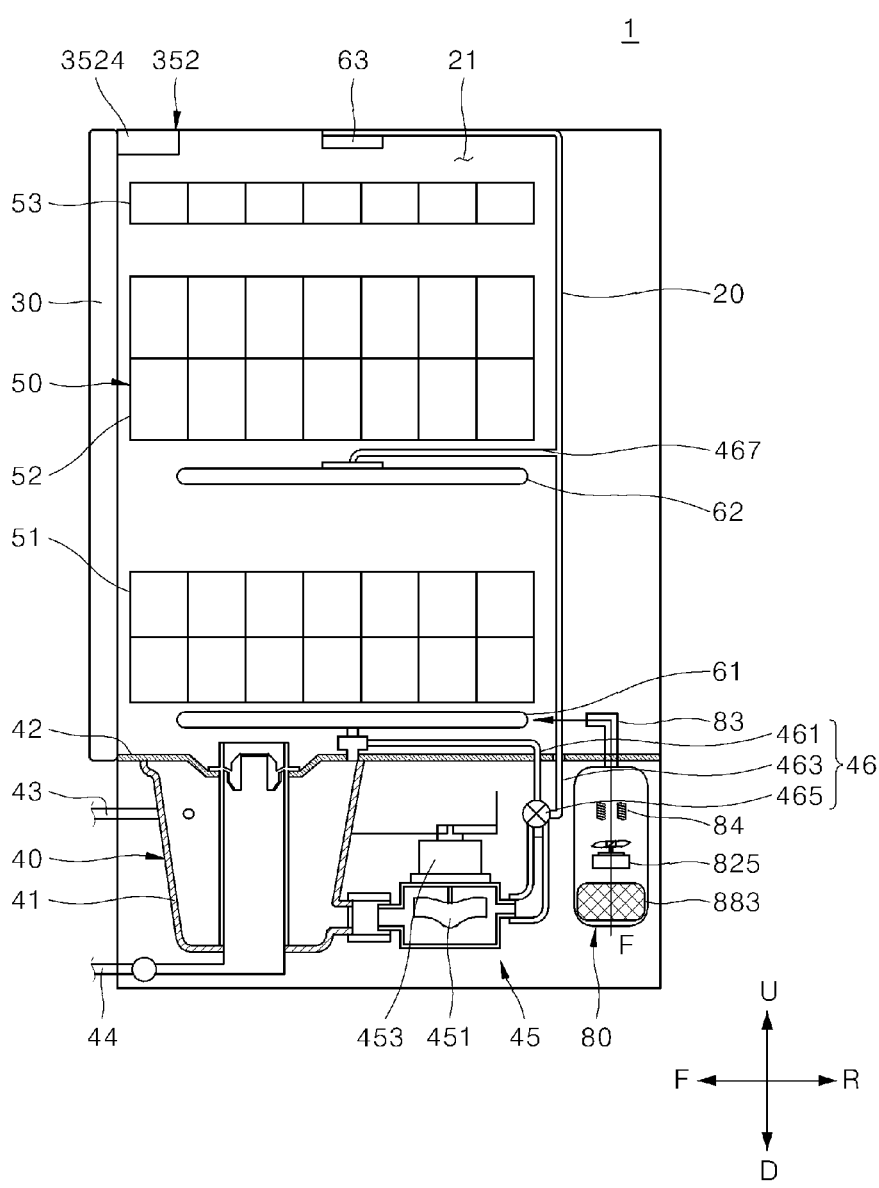
FIG. 2 is a schematic cross-sectional view showing the dishwasher in FIG. 1.

FIG. 1 is a front perspective view showing a dishwasher of the present disclosure. FIG. 2 is a schematic cross-sectional view showing the inner structure of the dishwasher of the present disclosure.

As illustrated in FIGS. 1 and 2, the dishwasher 100 of the present disclosure may comprise a main body 10 having a wash space therein and having a front that is open, a tub 20 being installed in the main body 10, forming a wash space 21 in which a wash target is washed and having a front surface that is open, a door 30 opening and closing the open front surface of the tub 20, a driving part 40 being disposed at the lower part of the tub 20, and supplying, collecting, circulating and draining wash water for washing a wash target, a storage part 50 being detachably provided in the wash space 21 of the tub 20 and allowing a wash target to sit in, and a spray nozzle 61, 62 being installed near the storage part 50 and spraying wash water for washing a wash target. For example, the driving part 40 may comprise a water supply device (1110 in FIG. 11) and a washing device (1150 in FIG. 11).

For example, a wash target to sit in the storage part 50 may comprise tableware such as a bowl, a dish, a spoon, chopsticks and the like and cooking tools. Hereafter, a wash target may be a tableware, unless stated otherwise.

In one embodiment, the tub 20 may be formed into a box having a front surface that is entirely open and correspond to a so-called wash tub.

For example, the tub 20 may have a wash space 21 therein, and its open front surface may be opened and closed by the door 30.

The tub 20 may be formed in a way that a metal panel exhibiting high resistance against high temperature and moisture, e.g., a stainless steel-based panel, is pressed.

In one embodiment, a plurality of brackets may be disposed on the inner surface of the tub 20, such that functional components such as a storage part 50, a spray nozzle 61, 62 and the like described hereafter are supported and installed in the tub 20.

For example, the driving part 40 may comprise a sump 41 storing wash water, a sump cover 42 for distinguishing the sump 41 from the tub 20, a water supply pipe 43 supplying wash water to the sump 41 from the outside, a water discharge pipe 44 discharging wash water of the sump 41 to the outside, and a wash pump 45 and a supply channel 46 for supplying wash water of the sump 41 to the spray nozzle 61, 62.

The sump cover 42 may be disposed on the sump 41 and play a role in distinguishing the tub 20 from the sump 41. Additionally, the sump cover 42 may have a plurality of return holes for returning wash water, having sprayed to the wash space 21 through the spray nozzle 61, 62, to the sump 41.

For example, wash water having sprayed to tableware from the spray nozzle 61, 62 may fall to the lower part of the wash space 21, and go back into the sump 41 by passing through the sump cover 42.

In one embodiment, the wash pump 45 may be provided at a lateral part or the lower part of the sump 41, and pressurize wash water and supply the same to the spray nozzle 61, 62.

One end of the wash pump 45 may connect to the sump 41, and the other end may connect to the supply channel 46. The wash pump 45 may be provided with an impeller 451, a motor 453 and the like. As electric power is supplied to the motor 453, the impeller 451 may rotate, and wash water of the sump 41 may be pressurized, then pass through the supply channel 46 and be supplied to the spray nozzle 61, 62.

In one embodiment, the supply channel 46 may selectively supply wash water supplied from the wash pump 45 to the spray nozzle 61, 62.

For example, the supply channel 46 may comprise a first supply channel 461 connecting to a first nozzle 61 (e.g., a lower spray arm), and a second supply channel 463 connecting to a second nozzle 62 (e.g., an upper spray arm) and a top nozzle 63. Additionally, the supply channel 46 may be provided with a supply channel diverting valve 465 that selectively opens and closes the supply channels 461, 463.

At this time, the supply channel diverting valve 465 may control the supply channels 461, 463 such that each of the supply channels 461, 463 is open consecutively or simultaneously.

In one embodiment, the spray nozzle 61, 62 may be provided to spray wash water to tableware and the like stored in the storage part 50.

For example, the spray nozzle 61, 62 may comprise a lower spray arm 61 being disposed at the lower part of the tub 20 and spraying wash water to a lower rack 51, an upper spray arm 62 being disposed between the lower rack 51 and an upper rack 52 and spraying wash water to the lower rack 51 and the upper rack 52, and a top nozzle 63 being disposed at the upper part of the tub 20 and spraying wash water to a top rack 53 or the upper rack 52.

For example, the lower spray arm 61 and the upper spray arm 62 may be rotatably provided in the wash space 21 of the tub 20, and spray wash water toward tableware of the storage part 50 while rotating.

Additionally, the lower spray arm 61 may be rotatably supported over the sump cover 42 to spray wash water toward the lower rack 51 while rotating under the lower rack 51.

Additionally, the upper spray arm 62 may be rotatably supported by a spray arm holder 467 to spray wash water to the lower rack 51 and the upper rack 52 while rotating between the lower rack 51 and the upper rack 52.

In the dishwasher 100 of one embodiment, the tub 20 may be further provided with a means for diverting the direction of wash water having sprayed from the lower spray arm 61 to the upward direction (U-direction), on a lower surface 25 thereof, to enhance washing efficiency.

Configurations that are well known in the art may be applied to a detailed configuration of the spray nozzle 61, 62. Accordingly, the detailed configuration of the spray nozzle 61, 62 is omitted, hereafter.

Further, a storage part 50 for storing tableware may be provided in the wash space 21

In one embodiment, the storage part 50 may be withdrawn through the open front surface of the tub 20 from the inside of the tub 20.

For example, FIG. 2 shows a storage part comprising a lower rack 51 being disposed at the lower part of the tub 20 and storing relatively large tableware, an upper rack 52 being disposed over the lower rack 51 and storing middle-sized tableware, and a top rack 53 being disposed at the upper part of the tub 20 and storing small-sized tableware and the like. In the present disclosure, a dishwasher provided with three storage parts 50 is described as an example, but not limited.

Each of the lower rack 51, the upper rack 52 and the top rack 53 may pass through the open front surface of the tub 20 and be withdrawn out of the tub 20.

To this end, a guide rail may be provided on both lateral walls forming the inner circumferential surfaces of the tub 20, and for example, the guide rail may comprise an upper rail, a lower rail, a top rail and the like.

Each of the lower rack 51, the upper rack 52 and the top rack 53 may be provided with a wheel at the lower part thereof. The user may withdraw the lower rack 51, the upper rack 52 and the top rack 53 outward through the front surface of the tub 20 to store tableware in them or to take out tableware easily from them after a wash.

The guide rail may be provided as a fixed guide rail which guides the withdrawal and insertion of the spray nozzle 61, 62, in the form of a simple rail, or a stretchable guide rail which guides the withdrawn and storage of the spray nozzle 61, 62 and the withdrawal distance of which increases as the spay nozzle 61, 62 is withdrawn.

Additionally, the door 30 may open and close the open front surface of the tub 20 described above.

A hinge part for opening and closing the door 30 is preferably provided at the lower part of the open front surface of the tub 20, and the door 30 rotates around the hinge part as a rotation axis and is opened. Additionally, a sensor (e.g., a first main sensor 1131, a second main sensor 1132 and a sub sensor 1133) for sensing the opening of the door 30 may be disposed in proper positions.

For example, the first main sensor 1131, and the second main sensor 1132 may be disposed at a joint of the main body of the dishwasher 100 contacting the upper surface of the door 30. The sub sensor 1133 may be disposed around the hinge part and sense the opening of the door 30.

A handle 31 for opening the door 30, and a control panel 32 for controlling the dishwasher 100 may be provide on the outer surface of the door 30.

Referring to FIG. 1, the control panel 32 may be provided with a display 33 displaying information on a current operation state and the like of the dishwasher visually, and a button part 34 comprising a selection button to which the user's selection manipulation is input, a power button to which the user's manipulation for turning on-off the dishwasher is input, and the like.

In one embodiment, the inner surface of the door 30 may form a mounting surface by which the lower rack 51 of the storage part 50 is supported as the door is fully opened, as well as forming one surface of the tub 20 as the door 30 is closed.

To this end, the inner surface of the door 30 is preferably formed into a horizontal surface in the same direction as the direction where the guide rail 54 guiding the lower rack 51 extends, as the door 30 is fully opened (e.g., as the door is forced to be opened completely by the user).

As illustrated in FIG. 2, a door-automatic-opening module 352 for opening the door automatically may be provided outside the upper surface of the tub 20.

In one embodiment, the door-automatic-opening module 352 moves the door 30 to a predetermined opening position to open the front surface 22 of the tub 20 partially, as a dry air supply part 80 described hereafter operates and then dry air is supplied into the tub 20.

Accordingly, air that is humidified while tableware is dried may be discharged through the upper part of the open front surface 22 of the tub 20.

For example, the door-automatic-opening module 352 may be provided with a push rod 3524 that rotates and moves the upper end of the rear surface of the door 30 to an opening position.

Additionally, the dry air supply part 80 may be provided at the lower part of the tub 20, and the dry air supply part 80 generates high-temperature or low-temperature dry air and supplies the same to the wash space in the tub 20.

In one embodiment, the dry air supply part 80 may comprise a filter 883 filtering external air, an air blowing fan 825 generating dry airflow, an air blowing motor 89 operating the air blowing fan 825, a heater 84 heating dry airflow, and an airflow guide 83 being disposed in the tub and guiding dry airflow.

For example, a dry air supply hole may be provided on the lower surface of the tub 20 and allow high-temperature dry air generated in the dry air supply part 80 to flow into the tub 20.

Figure 3:
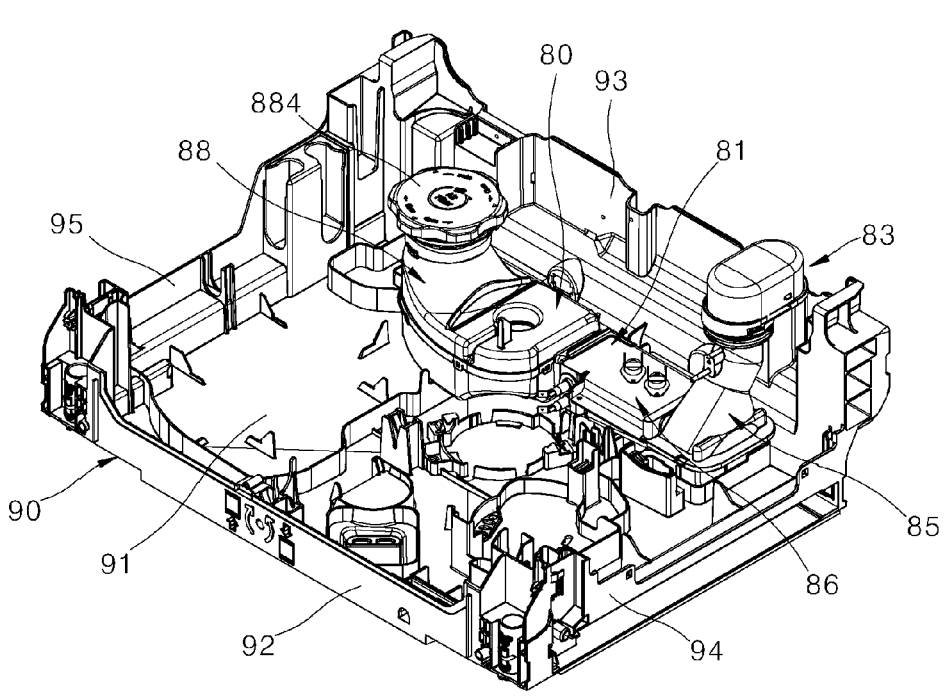
FIG. 3 is a front perspective view showing that a dry air supply part of the dishwasher of one embodiment is accommodated in a base.

A detailed configuration of the dry air supply part 80 is described hereafter with reference to FIGS. 1 to 3.

[Detailed Configuration of Dry Air Supply Part]

Figure 4:
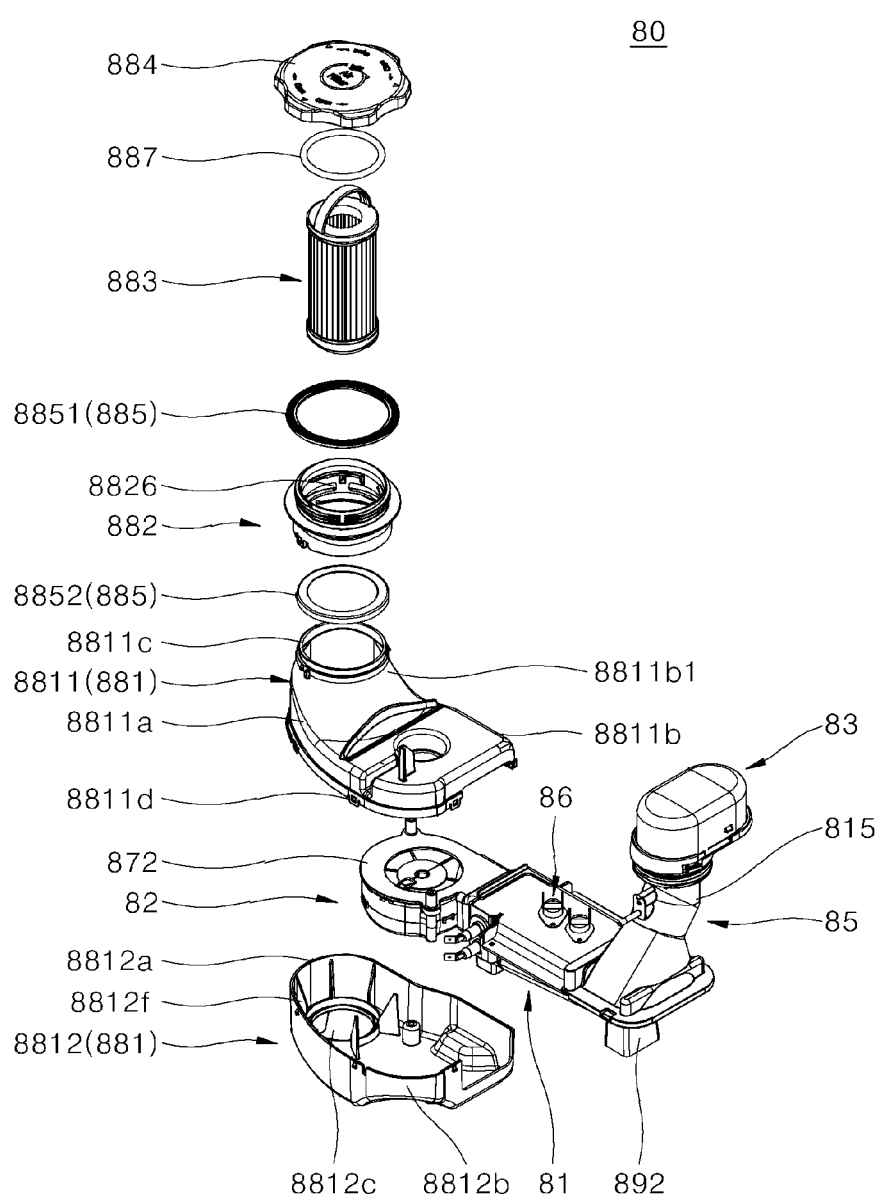
FIG. 4 is an exploded perspective view showing the dry air supply part in FIG. 3.
Figure 5:
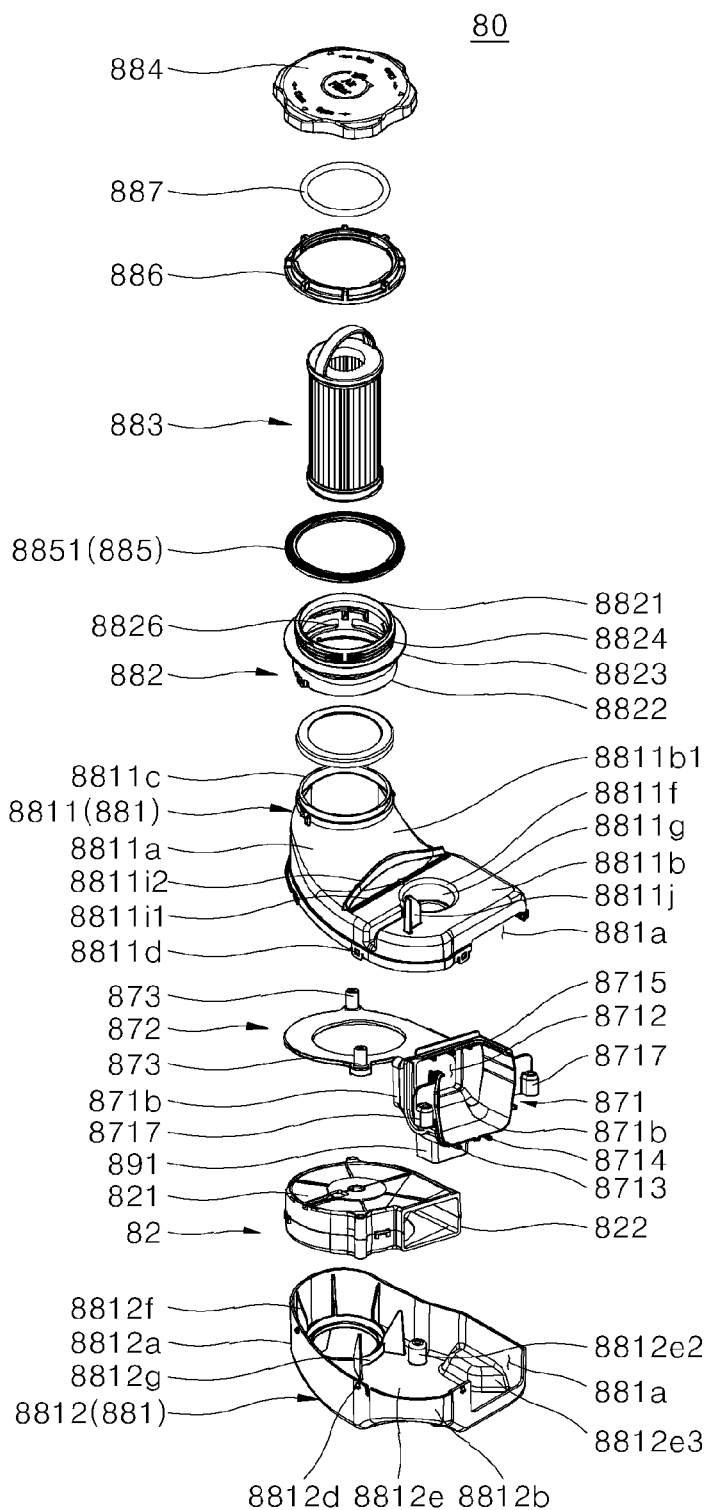
FIGS. 5 and 6 are exploded perspective views showing detailed configurations of a filter and a filter housing in FIG. 4.
Figure 6:
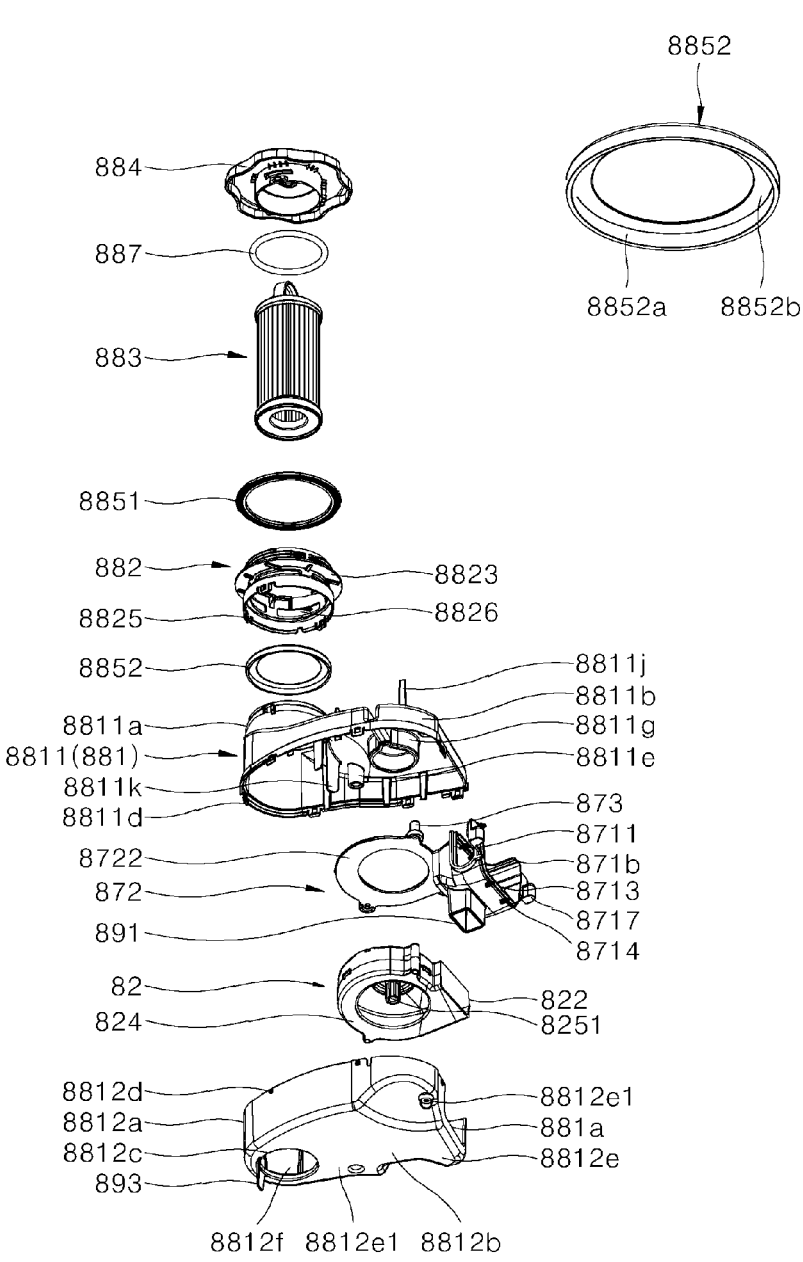
Figure 7:
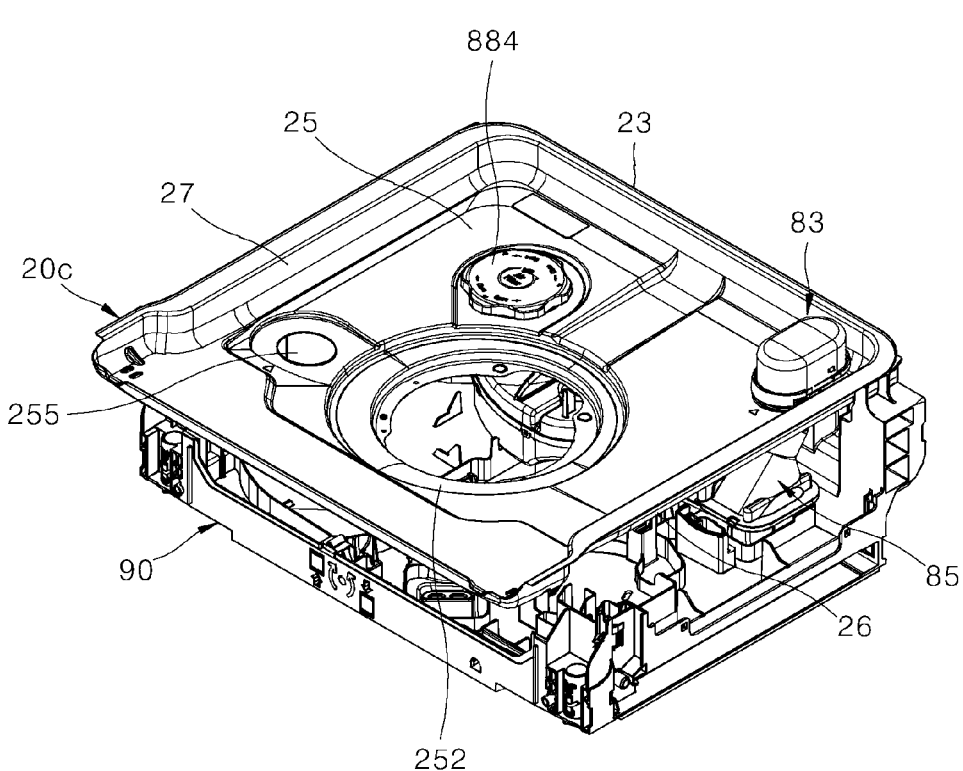
FIGS. 7 and 8 are front perspective views showing that a bottom tub is coupled to FIG. 3.
Figure 8:
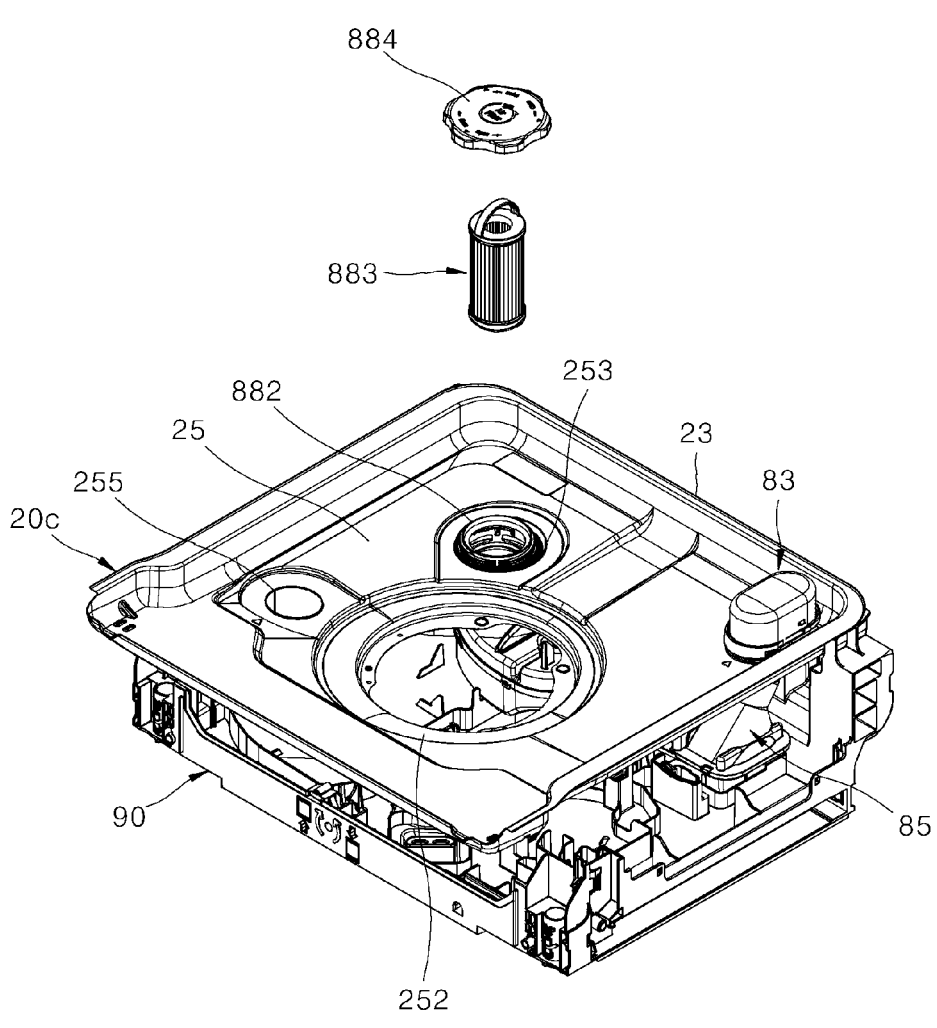

FIG. 3 is a front perspective view showing that a dry air supply part of the dishwasher of one embodiment is accommodated in a base. FIG. 4 is an exploded perspective view showing the dry air supply part in FIG. 3. FIGS. 5 and 6 are exploded perspective views showing detailed configurations of a filter and a filter housing in FIG. 4. FIGS. 7 and 8 are front perspective views showing that a bottom tub is coupled to FIG. 3.

Hereafter, a detailed configuration of the above-described dry air supply part 80 is described with reference to FIGS. 3 to 8.

As illustrated in FIG. 3, the dry air supply part 80 may be accommodated in the base 90 and disposed to be supported by a bottom surface 91 of the base 90.

For example, the dry air supply part 80 may be disposed in a position adjacent to a rear surface 93 of the base 90, or disposed in a position between a leakage sensing part and the rear surface 93 of the base 90 approximately in parallel with the rear surface 93 of the base 90.

The position of the dry air supply part 80 may be determined considering the characteristics of the dry air supply part 80 that generates high-temperature heat (a predetermined temperature (about 100° C.) or greater) during a supply of high-temperature dry air.

Additionally, the position of the dry air supply part 80 may be determined based on the position of the dry air supply hole formed on the lower surface 25 of the tub 20. That is, considering the safety of the user, the dry air supply hole into which dry air flows may be formed at a corner of the lower surface 25 of the tub 20, near the rear surface and the left surface.

For dry air to be effectively produced and supplied to the dry air supply hole formed in the above-described position, the dry air supply part 80 may be disposed at the lower side of the dry air supply hole.

However, the above-described position of the dry air supply part 80 is described as an example. The dry air supply part 80 may be disposed in a position near a left surface 94, a right surface 95 or a front surface 92 of the base 90, rather than the rear surface 93 of the base 90. Hereafter, the dry air supply part 80, which is disposed near the rear surface 93 of the base 90 approximately in parallel with the rear surface 93, is described, but the position of the dry air supply part 80 is not limited.

In one embodiment, a support rib for supporting the dry air supply part 80 and preventing the escape of the dry air supply part 80, a plurality of guide ribs for setting the position of a leakage sensing part detecting whether wash water leaks from the tub 20 and preventing the escape of the leakage sensing part, and a wash water rib for guiding wash water that is discharged from the dry air supply part 80 to the leakage sensing part may be provided on the bottom surface 91 of the base 90.

For example, the support rib, the guide rib and the wash water rib may be integrally formed on the bottom surface 91 of the base 90.

A first leg 891, a second leg 892 and a third leg 893 of the dry air supply part 80, which are described hereafter, may be coupled to the support rib, based on a non-fastening method. That is, the first leg 891, the second leg 892 and the third leg 893 are simply held at the support rib with an additional fastening means such that the dry air supply part 80 is supported with respect to the up-down direction, the front-rear direction and the left-right direction.

FIGS. 4 to 6 show a detailed configuration of the dry air supply part 80.

In one embodiment, the dry air supply part 80 generating dry airflow F and supplying the same into the tub 20 may comprise an air blowing fan 825 generating dry airflow F that is supplied into the tub 20, a heater 84 heating dry air, a heater housing 81 having an air passage in which the heater 84 is accommodated, and a filter 883 filtering air to be suctioned into the air blowing fan 825.

In one embodiment, the air blowing fan 825 is disposed upstream in the direction of dry airflow F with respect to the heater 84 and the heater housing 81, and accelerates air to the air passage formed in the heater housing 81 to generate dry airflow F.

For example, the air blowing fan 825, and the air blowing motor 89 producing a rotation driving force of the air blowing fan 825 may form an assembly in a way that the air blowing fan 825 and the air blowing motor 89 are modularized mutually and accommodated in a fan housing 82.

The air blowing fan 825 and the fan housing 82 may be fixed to a housing connector 87 that connects a filter housing 881 of a filtering part 88 described hereafter and the heater housing 81.

For example, the air blowing fan 825 and the fan housing 82 may be entirely accommodated in the filter housing 881, in the state of being fixed to the housing connector 87.

In one embodiment, the type, such as the sort, size and the like, of the air blowing fan 825 that is applied to the dry air supply part 80 is not limited. However, a Sirocco fan may be appropriate for the air blowing fan 825 considering limitations to the position and space in which the air blowing fan 825 is installed.

For example, in the case where a Sirocco fan is applied to the air blowing fan 825, air filtered by the filter 883 may be suctioned through a lower surface 824 of the fan housing 82 from the center of the Sirocco fan, in a direction parallel with the direction of the rotation axis, and the suctioned air may be accelerated and discharged radially toward the outside of a radial direction.

The accelerated and discharged air may flow into the air passage in the heater housing 81 through the fan housing 82 and an inlet 8712 of the housing connector 87, while forming dry airflow F.

At this time, the air blowing fan 825, i.e., the Sirocco fan, and a rotation shaft 8251 of the motor may be disposed to have directionality approximately parallel with the up-down direction (U-D direction), for example, and air filtered by the filter 883 may be suctioned through the lower surface 824 of the fan housing 82. For example, the filter 883 may be an air filter.

In one embodiment, a PCB substrate for controlling the motor may be built into an upper surface 821 of the fan housing 82, which corresponds to an opposite side of the lower surface 824 into which air filtered by the filter 883 is suctioned.

Figure 11:
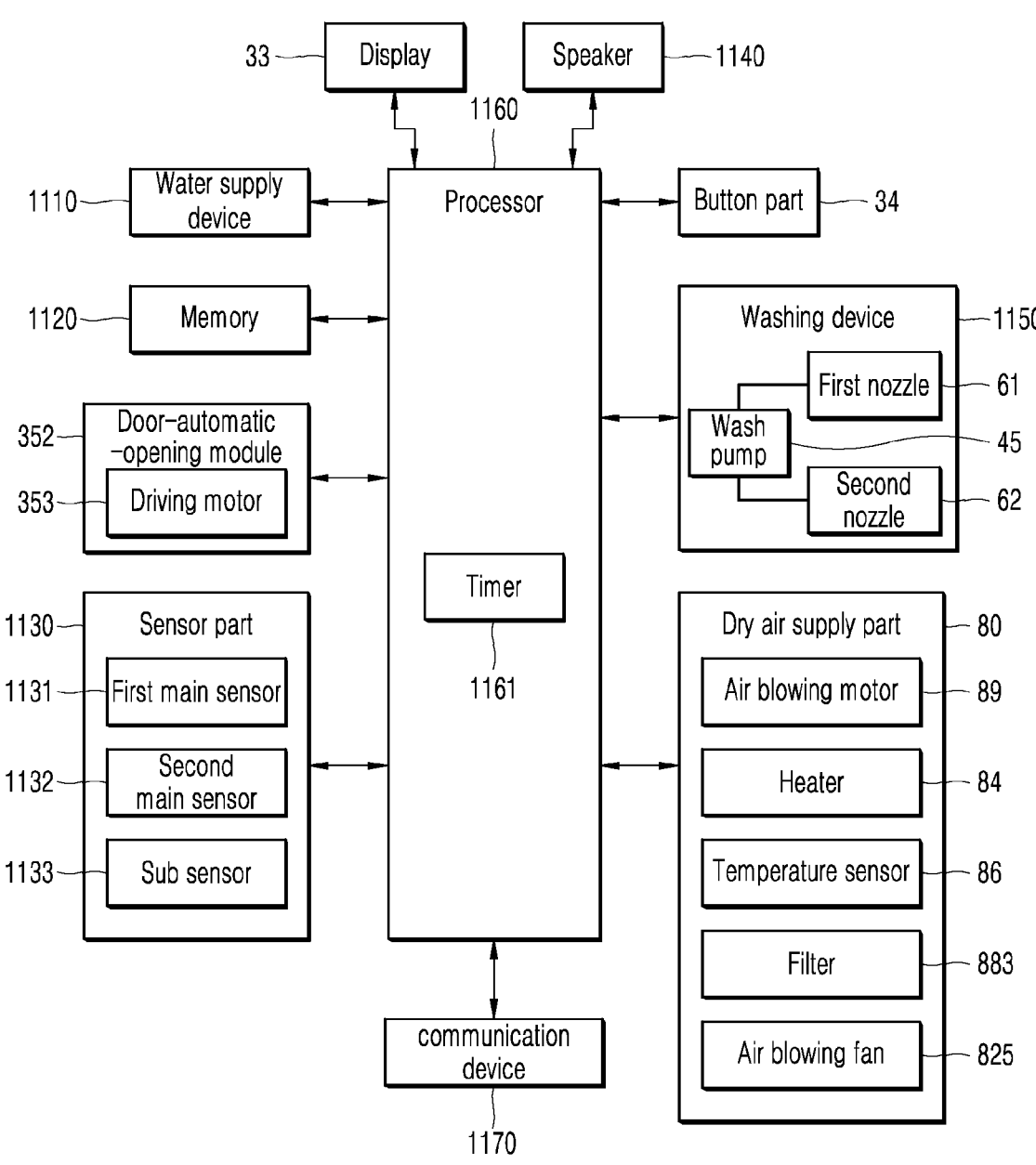
FIG. 11 is a block diagram showing the dishwasher of one embodiment.

For example, each of the components described hereafter in FIG. 11 is disposed on the PCB substrate, and the components may connect to one another electrically.

In one embodiment, the fan housing 82, as illustrated, may be fixed to a ring-shaped connection tab 872 provided at the housing connector 87 through a fastening means such as a screw bolt and the like, for example.

For example, the connection tab 872 may extend in the direction where connection tab 872 covers from the inlet 8712 of a connector main body 871 to the upper surface 821 of the fan housing 82.

Additionally, as illustrated in FIGS. 7 and 8, the connection tab 872 may be provided with a pair of fastening bosses 873 that extends from the upper surface of the connection tab 872 in the upward direction (U-direction).

For example, the pair of fastening bosses 873 may be coupled to a guide boss 8811e provided in a first housing 8811 that corresponds to the upper housing of the filtering part 88, in the state where the pair of fastening bosses 873 is disposed at the base 90.

In one embodiment, the connector main body 871 of the housing connector 87 may be coupled to an open front end of the heater housing 81, which is disposed downstream with respect to the flow direction of dry airflow, to form an air passage C through which dry airflow flows together with the heater housing 81.

To this end, the connector main body 871 may be formed into a box that has a hollow hole and a vacant inside.

On the inner surface of the connector main body 871, the cross section of the air passage C may gradually increase along the direction where dry airflow flows, and the cross section of a rear end part 871b of the connector main body 871, to which the heater housing 81 is coupled, may be approximately the same as the cross section of the front end part of the heater housing 81. Thus, the flow loss of dry airflow may be minimized.

To support the fan housing 82 and the heater housing 81, the first leg 891 may be integrally formed at the lower part of the connector main body 871, and protrude toward the base.

In one embodiment, the upper surface and the front surface of the connector main body 871 having a box shape, as illustrated, may be open at least partially.

The connector main body 871's upper surface and front surface that are open at least partially provide a passage into which the heater 84 enters while the heater 84 is disposed in the air passage C and fixed to the inside of the air passage C.

The heater 84 may be supported indirectly in the state of separating from the heater housing 81 and the connector main body 871.

The front end side of the heater 84 may be supported by a terminal fixation part, in the state of separating from the connector main body 871. A pair of terminals may be fixed to the front surface of the terminal fixation part, in the state of protruding outward.

The partially open front surface of the connector main body 871 may have a fixation slot 8711 which has a U shape corresponding to the outer shape of the terminal fixation part and to which the terminal fixation part is coupled in a sliding manner.

The up-down slide of the terminal fixation part may be guided by the edge of the fixation slot 8711, and have a guide groove that is coupled to the edge of the fixation slot 8711.

The partially open upper end of the connector main body 871 may be covered and shielded by an upper housing 812.

In one embodiment, a plurality of second support ribs 8715 may be provided under the coupling surface 8716, and support the front end part of the upper housing 812, having entered into the connector main body 871, from below.

The connector main body 871's rear end part 871b that is open entirely may be fixed to the heater housing 81 while being fit-coupled to the heater housing 81.

At this time, the rear end part 871b of the connector main body 871 may be fit-coupled to the heater housing 81 in a way that the rear end part 871b of the connector main body 871 is partially inserted into the heater housing 81.

To form a fit-coupling for ensuring surface contact, a plurality of first support ribs 8714 may be provided at the rear end part 871b of the connector main body 871, as illustrated.

In one embodiment, the heater (84 in FIG. 10) is disposed in the air passage formed in the heater housing 81, and preferably, is exposed directly to dry airflow F in the air passage and heats the dry airflow F.

In one embodiment, in the case where the dry air supply part 80 supplies high-temperature dry air, power is supplied to the heater 84 and the heater 84 heats dry air, and in the case where the dry air supply part 80 supplies low-temperature dry air, a supply of power to the heater 84 is cut off and the heater 84 stops operating.

In the case where the dry air supply part 80 supplies low-temperature dry air, the air blowing motor may keep operating such that dry airflow F is generated.

The type of the eater 84 provided in the dry air supply part 80 is not limited, but for example, a tube-shaped sheath heater may be selected as the heater 84 since the tube-shaped sheath heater has a relatively simple structure, ensures excellent efficiency of generating heat and is advantageous in preventing electric leakage caused by wash water that is drawn reversely from the tub 20.

To enhance efficiency of a heat exchange, the heater 84, i.e., a sheath heater, may be directly exposed to dry airflow F, in the air passage inside the heater housing 81, and to ensure a maximum heat transfer surface, have a stereoscopic shape with a plurality of bends.

One end part and the other end part of the heater 84 may extend by passing through the front surface of the connector main body 871 of the housing connector 87.

Additionally, a pair of terminals for receiving power may be formed at one end part and the other end part of the heater 84.

As illustrated, the pair of terminals may be installed in and fixed to the connector main body 871 though a terminal fixation part.

At this time, a fixation slot 8711 may be provided on the front surface of the connector main body 871 so that the terminal fixation part can be fitted and coupled in a sliding manner.

In one embodiment, the front end side of the heater 84, as described above, may be fixed and supported through the terminal fixation part.

Figure 10:
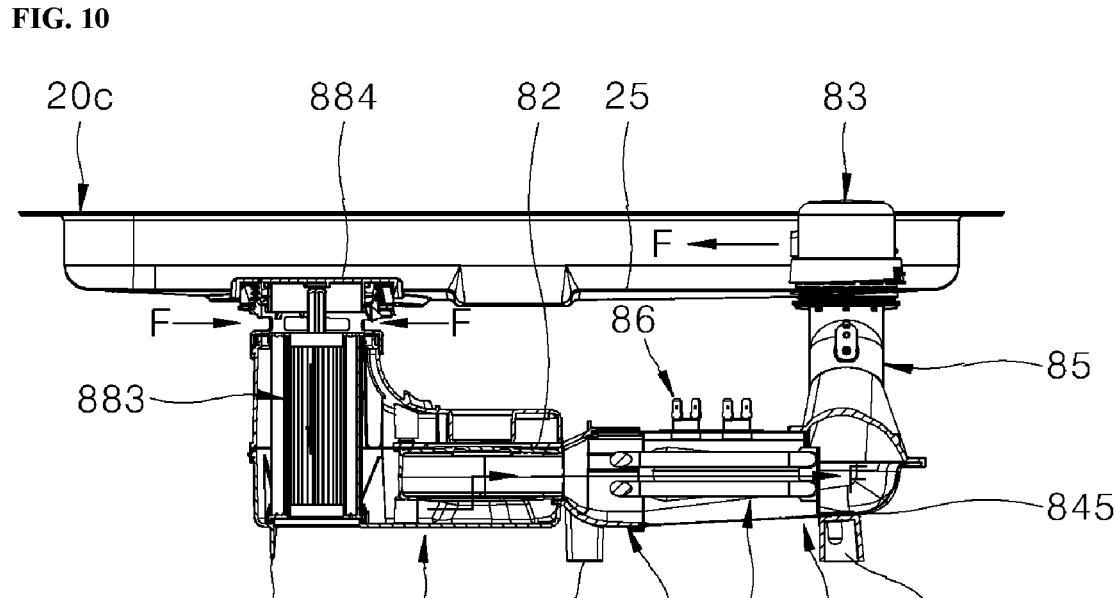
FIG. 10 is a cross-sectional view along A-A in FIG. 9.

The rear end side of the heater 84 may be fixed and supported through a single heater bracket 845 disposed in the heater housing 81, as illustrated in FIG. 10. That is, the rear end side of the heater 84 may be supported on the air passage through the heater bracket 845, in the state of separating from the heater housing 81.

In one embodiment, a temperature sensor 86 may be provided on an upper surface 8121a of the upper housing 812 of the heater housing 81, as a temperature sensing part that senses the temperature of high-temperature dry air generated through the heater 84 or detects whether the heater 84 overheats.

For example, the temperature sensor 86 may comprise a thermistor sensing the temperature of dry air, and a thermostat detecting whether the heater 84 overheats.

An output signal of the temperature sensor 86 may be delivered to a processor (1160 in FIG. 11), and the processor (1160 in FIG. 11) receives the output signal of the temperature sensor 86 to determine the temperature of high-temperature dry air and the overheating of the heater 84. At a time of the overheating of the heater 84, the processor (1160 in FIG. 11) may cut off a supply of power to the heater 84, to change the operation of the dry air supply part 80 from the operation of supplying high-temperature dry air to the operation of supplying low-temperature dry air.

In one embodiment, the heater housing 81 may be formed into a hollow hole with a vacant inner space, to have an air passage thereinside, and the heater 84 and the heater bracket 845 described above may be disposed in the air passage.

At this time, for dry airflow F to move, the front end part of the heater housing 81, corresponding to an upstream side with respect to the direction in which the dry airflow F moves, and the rear end part of the heater housing 81, corresponding to a downstream side with respect to the direction in which the dry airflow F moves, may be open at least partially.

In one embodiment, the dry air supply part 80 may further comprise a connection duct part 85 coupled to an outlet which is formed at the end part side of the left of the heater housing 81 and is open in the upward direction (U-direction), and having an air passage therein.

As described above, the heater housing 81 and the air blowing fan 825 may be disposed under the lower surface 25 of the tub 20. The connection duct part 85 may guide dry air discharged from the heater housing 81 to a predetermined position, e.g., to the dry air supply hole formed at the tub 20.

For example, the predetermined position may be the lower surface 25 of the tub 20, and the dry air supply hole, into which dry airflow F guided to the connection duct part 85 is drawn, may be formed at a corner of the lower surface 25 of the tub 20, which is adjacent to the rear surface 23 and the left surface 26.

As shown in the embodiment, a duct main body 851 of the connection duct part 85 may be formed to connect the dry air supply hole of the tub 20 and the heater housing 81, to change the direction of dry airflow.

For example, a lower end part 8512 the duct main body 851 of the connection duct part 85 fluid-connects to the outlet of the heater housing 81, and an upper end part 8511 extends in the upward direction (U-direction) to have a cylinder shape connecting to the dry air supply hole.

The lower end part 8512 of the duct main body 851 may be coupled to the heater housing 81 in a sliding manner.

In one embodiment, considering the cross section of a rectangular outlet of the heater housing 81, the lower end part of the duct main body 851 may have a rectangular container shape, and the upper end part of the duct main body 851 may have a circular container shape to prevent leakage of water.

For example, to enhance efficiency of a coupling between the upper end part 8511 of the duct main body 851 and the dry air supply hole of the tub 20 and prevent leakage of water, the duct main body 851 may be formed into a cylinder shape.

An airflow guide 83 may be coupled to the upper end part 8511 of the duct main body 851, and change the direction of dry airflow supplied through the duct main body 851, and supply dry air to the wash space.

The filtering part 88 may be disposed at the upstream side of the heater 84 with respect to the flow direction of dry airflow, to filter air to be suctioned into the air blowing fan 825 and supply the filtered air to the heater 84.

Specifically, the filtering part 88 may comprise a filter 883 filtering air to be suctioned into the air blowing fan 825, and a filter housing 881 that has a hollow hole shape and has a filter accommodation space in which the filter 883 is disposed in a replaceable manner, and a fan housing accommodation space in which the fan housing 82 is disposed.

As illustrated in FIGS. 5 and 6, the filter housing 881, for example, may comprise a first housing 8811 and a second housing 8812 that are disposed as a segment segmented with respect to the up-down direction (U-D direction). At this time, the first housing 8811 may be an upper housing, and the second housing 8812 may be a lower housing.

In one embodiment, the filter housing 881 accommodates and supports the filter 883 and the fan housing 82 of the air blowing fan 825.

For example, the first housing 8811 may be divided into a filter accommodation part 8811a and a fan housing accommodation part 8811b to at least partially accommodate and support the filter 883 and the fan housing 82, preferably, accommodate and support the upper part of the filter 883 and the upper part of the fan housing 82.

As illustrated, the lower surfaces of the filter accommodation part 8811a and the fan housing accommodation part 8811b of the first housing 8811 are open entirely such that the second housing 8812 is coupled to the lower part side of the filter accommodation part 8811.

In one embodiment, the filter accommodation part 8811a may be disposed further upstream than the fan housing accommodation part 8811b with respect to the direction in which dry airflow flows, and in the illustrative embodiment, may be formed at the right side of the fan housing accommodation part 8811b.

The filter accommodation part 8811a, for example, may have an outer shape of a cylinder such that the filter 883 having a cylinder shape is accommodated in a way that the filter 883 is inserted into and withdrawn from the filter accommodation part 8811a, at a time when the filter 883 is replaced.

Additionally, a filter guide rib 8811k may be integrally provided in the filter accommodation part 8811a and have a shape similar to the shape of a filter guide rib 8812f of the second housing 8812 described hereafter.

In one embodiment, a coupling opening 8811c may be formed at the upper end of the filter accommodation part 8811a and be open in a circular shape to correspond to the outer shape of the filter 883. The filter 883 may pass through the coupling opening 8811c and move downward up to the filter accommodation part 8812a of the second housing 8812.

In one embodiment, the fan housing accommodation part 8811b may be formed further downstream than the filter accommodation part 8811a with respect to the direction in which dry airflow flows, and in the illustrative embodiment, integrally formed at the right side of the filter accommodation part 8811*a*, near the heater housing 81.

The fan housing accommodation part 8811*b* may have an inner shape corresponding to the outer shape of the upper part of the fan housing 82, to cover the upper part of the air blowing fan 825 entirely. For example, the upper surface of the fan housing accommodation part 8811*b* may be formed into a flat plate.

However, a vent hole 8811*f* may be provided at a central part side of the upper surface of the fan housing accommodation part 8811*b*, to at least partially expose the upper surface 821 area of the fan housing where the above-described PCB substrate of the air blowing fan 825 and a PCB substrate for cooling the motor are provided. A vent duct 8811*g* may be formed at the lower part of the vent hole 8811*f*, and be formed into a cylinder with a hollow hole and extend toward the upper surface 821 of the fan housing 82.

In one embodiment, a water discharge channel 8811*h* formed into a slit may be provided on the upper surface of the fan housing accommodation part 8811*b*, and one end part of the water discharge channel 8811*h* connects to the lower end of the vent duct 8811*g* and the other end part extends up to the front surface of the first hosing 8811. Accordingly, wash water drawn into the vent hole 8811*f* may move through the water discharge channel 8811*h* and be discharged toward the base 90.

As illustrated, an inclined surface 8811*b*1 may be provided on the upper surface of the first housing 8811, and connect the upper end of the filter accommodation part 8811*a* and the fan housing accommodation part 8811*b*. The water discharge channel 8811*h* discharges wash water that is drawn into the vent duct 8811*g* along the inclined surface after leaking from the upper end of the filter accommodation part 8811*a*.

As a means to minimize the inflow of washer water moving along the inclined surface to the vent duct, a blocking rib may be integrally provided on the upper surface of the first housing. For example, the blocking rib may comprise a first blocking rib 8811*i*1 provided on the upper surface of the fan housing accommodation part 8811*b*, and a second blocking rib 8811*i*2 provided on the inclined surface 8811*b*1. The first blocking rib 8811*i*1 may extend in a line shape along the front-rear direction, and the second blocking rib 8811*i*2 may extend in a curved line shape along the front-rear direction.

In one embodiment, a pair of guide bosses 8811*e* may be provided in the first housing 8811 and protrude from the upper surface of the first housing 8811 toward the fan housing 82. Each of the guide bosses 8811*e* protrudes toward the connection tab 872 of the housing connector 87 described above, and respectively joins the pair of fastening bosses 873 provided at the connection tab 872.

Additionally, the left surface of the fan housing accommodation part 8811*b* of the first housing 8811 is partially open to form a portion of a housing connector coupling hole 881*a*. The remaining portion of the housing connector coupling hole 881*a* may be formed on the left surface of a fan housing accommodation part 8812*b* of the second housing 8812 described hereafter.

In one embodiment, the connector main body 871 of the housing connector 87 may be inserted into the filter housing 881 at least partially by passing through the housing connector coupling hole 881*a*. Thus, the housing connector coupling hole 881*a* may have a shape corresponding to the outer shape of the connector main body 871.

In one embodiment, the second housing 8812 of the filter housing 881 may be coupled to the lower part of the first housing 8811 to form a sealed accommodation space, and accommodate and support the lower parts of the filter 883 and the fan housing 82.

Like the first housing 8811, the second housing 8812 may be divided into a filter accommodation part 8812*a* and a fan housing accommodation part 8812*b*, to accommodate and support the lower part of the filter 883 and the lower part of the fan housing 82.

As illustrated, the upper end of the second housing 8812 may be open entirely, to be coupled to the lower end of the first housing 8811.

In one embodiment, to correspond to the filter guide rib 8811*k* of the filter accommodation part 8811*a* of the first housing 8811, a plurality of filter guide ribs 8812*f* may be provided at the filter accommodation part 8812*a* of the second housing 8812, which is provided under the filter accommodation part 8811*a* of the first housing 8811, and guide the movement of the filter 883 at a time of insertion of the filter 883 and prevent the filter 883 from escaping from the right position.

The filter guide rib 8812*f* may protrude upward from a bottom surface 8812*e* of the filter accommodation part 8812*a*, and the lower end of the filter guide rib 8812*f* may be integrally formed on the bottom surface 8812*e* of the filter accommodation part 8812*a*.

The plurality of filter guide ribs 8812*f* may be arranged and disposed radially around the filter 883, to correspond to the outer shape of the filter 883 having a cylinder shape.

In one embodiment, a lower suction opening 8812*c* may be formed on the bottom surface 8812*e* of the filter accommodation part 8812*a*, as the center of the plurality of filter guide ribs 8812*f*, in a penetrating manner. The lower suction opening 8812*c* may be open toward the lower surface of the base 90, and external air may be drawn into the lower suction opening 8812*c*.

The lower suction opening 8812*c* may be formed into a circle, to correspond to the lower opening of the filter 883 having a cylinder shape, and its relative position and size may be determined to allow external air to pass through the lower opening and flow into the filter 883 smoothly.

In one embodiment, as an airtight means, a pair of ring-type ribs may be formed around the lower suction opening 8812*c*, on the bottom surface 8812*e* of the second housing 8812, to prevent non-filtered external air from leaking and flowing directly into the inner space of the filter housing 881.

In one embodiment, the fan housing accommodation part 8812*b* may be formed further downstream than the filter accommodation part 8812*a*, with respect to the direction in which dry airflow flows, and in the illustrative embodiment, be integrally formed at the right side of the filter accommodation part 8812*a*, near the heater housing 81.

The fan housing accommodation part 8811*b* may have an inner shape corresponding to the outer shape of the lower part of the fan housing 82, to cover the lower part of the air blowing fan 825 entirely.

The bottom surface 8812*e* of the fan housing accommodation part 8811*b* may be spaced a predetermined distance apart from the lower surface 824 of the fan housing 82 to allow filtered air to be suctioned effectively, and preferably, have a flat surface shape that is formed in a direction parallel with the horizontal direction.

As a means of separating the fan housing 82 from the bottom surface 8812*e* of the fan housing accommodation part 8811*b* and supporting the fan housing 82, a plurality of raised surface parts 8812*e*3 and a screw boss 8812*e*2 may be provided in the fan housing accommodation part 8812*b* and protrude from the bottom surface 8812*e*.

In one embodiment, the plurality of raised surface parts 8812*e*3 is disposed to avoid another structure at the lower part of the second housing 8812, and for example, disposed to avoid the ribs and the leakage sensing part of the base that are disposed at the lower part of the second housing 8812.

Accordingly, the shape of an individual raised surface part 8812*e*3 may vary depending on the shape of another structure that is avoided by the raised surface part 8812*e*3.

The plurality of raised surface parts 8812*e*3 may be used as a support part that supports the fan housing 82 in the state where the fan housing 82 is spaced from the bottom surface of the fan housing accommodation part 8811*b*. Thus, the air blowing fan 825 may be disposed in a way that the lower surface 824 of the fan housing 82 surface-contacts the upper end surface of an individual raised surface part 8812*e*3.

Further, the plurality of raised surface parts 8812*e*3 may function as a stopper that prevents the filter housing 881 from moving relative to the base 80 in the front rear direction.

The screw boss 8812*e*2 supports the lower surface 824 of the fan housing 82, together with an individual raised surface part 8812*e*3. Additionally, the screw boss 8812*e*2 may be provided with a bolt hole 8812*e*1 into which one of the pair of screw bolts fastening the fan housing 82 and the connection tab 872 of the housing connector 87 at the same time is inserted.

Another bolt hole 8812*e*1 may be formed at any one of the plurality of raised surface parts 8812*e*3 in a penetrating manner.

In the first housing 8811 and the second housing 8812 disposed in the form of a segment, the lower end of the first housing 8811 and the upper end of the second housing 8812 may be detachably coupled to each other.

To achieve a detachable coupling relationship described above, a fastening tab 8811*d* extending toward the second housing 8812 may be provided at the lower end of the first housing 8811, and a hook projection 8812*d* may be provided at the upper end of the second housing 8812 and be fastened to the fastening tab 8811*d* based on a hook-coupling method.

Additionally, a tub connection duct 882 may be detachably coupled and fastened to the coupling opening 8811*c* of the filter accommodation part 8811*a* of the first housing 8811.

The filter 883 of the filtering part 88 of one embodiment may be replaced through the lower surface 25 of the tub 20.

To this end, the filter accommodation part 8811*a* of the first housing 8811 needs to connect to the lower surface 25 of the tub 20, and the tub connection duct 882 may connect the lower surface 25 of the tub 20 and the filter accommodation part 8811*a* of the first housing 8811 mutually.

The tub connection duct 882 may be integrally provided at the filter accommodation part 8811*a* of the first housing 8811. However, a tub connection duct 882, which is provided at the first housing 8811 independently as illustrated, is described as an example, hereafter.

Like the duct main body 851 of the connection duct part 85 described above, the tub connection duct 882 may have an upper end part 8821 that passes through the lower surface 25 of the tub 20 and extends upward.

As illustrated in FIGS. 7 and 8, a filter replacement hole 253 may be provided on the lower surface 25 of the tub 20 to allow the upper end part 8821 of the tub connection duct 882 to be inserted.

A sump hole 252 in which the sump 41 is mounted may be provided at a central part side of the lower surface 25 of the tub 25, and a collection surface may be formed on the lower surface 25 of the tub 20 and have an inclination angle at which the collection surface inclines downward gradually toward the sump hole 252 to effectively collect wash water in the sump hole 252.

As illustrated, the filter replacement hole 253 may be disposed behind the sump hole 252, on the collection surface.

In one embodiment, to distinguish the filter replacement hole 253 from the dry air supply hole, the filter replacement hole 253 may be formed at a corner of the lower surface 25 of the tub 20, near the rear surface and the right surface of the tub 20. Additionally, to ensure convenience of withdrawal and insertion of the filter 883 at a time of replacement of the filter 883, the filter replacement hole 253 may be disposed closer to the front surface of the tub 20 than the dry air supply hole, and disposed further rearward than a water softener communication hole 255.

In one embodiment, the water softener communication hole 255, which is formed at the front of the filter replacement hole 253, is used for insertion and the like of a water softening agent into a water softener (no illustrated) that is provided at the lower part of the water softener communication hole 255, for example. However, the water softener communication hole 255 may also be used for replacement, management and repairs of another component such as a water filter and the like of the water supply part.

In one embodiment, the filter replacement hole 253 may be disposed between the water softener communication hole 255 and the dry air supply hole with respect to the front-rear direction or the left-right direction.

That is, the filter replacement hole 253 may be disposed outside a virtual extension line connecting the water softener communication hole 255 and the dry air supply hole.

Thus, even if a plurality of openings is formed on the lower surface 25 of the tub 20, deterioration in the strength of the tub 20 may be prevented, thereby enhancing torsional rigidity and flexural rigidity of the tub 20.

In one embodiment, to distinguish the filter replacement hole 253 from the water softener communication hole 255 formed at the front of the filter replacement hole 253, a sealing cap 884 having a shape or a color different from that of a water softening agent insertion opening 255 may be applied to the upper end of the tub connection duct 882, passing through the filter replacement hole 255 and being exposed to the wash space.

To enhance efficiency of a coupling between the upper end part 8821 of the tub connection duct 882 and the filter replacement hole 253 of the tub 20 and prevent leakage of water, the tub connection duct 882 may have a cylinder shape.

As a means of enhancing efficiency of a coupling and preventing leakage of water, a ring-shaped flange 8823 and a male screw part 8824 may be provided at the upper end part 8821 side of the tub connection duct 882.

The upper end part 8821 of the tub connection duct 882 may pass through the lower surface 25 of the tub 20 and extend in the upward direction (U-direction), and the upper end part 8821 of the tub connection duct 882 and the male screw part 8824 may pass through the lower surface 25 of the tub 20 at least partially and protrude toward the inside of the tub 20.

As described above, the filter replacement hole 253 may be provided on the collection surface provided on the lower surface 25 of the tub 20. Accordingly, the upper end part 8821 of the tub connection duct 882 that is coupled to the filter replacement hole 253, and the flange 8823 may have a predetermined inclination angle with respect to the perpendicular direction, to correspond to the inclination angle of the collection surface of the tub 20, i.e., may be formed at a slant with respect to the perpendicular direction.

A fastening nut 886 may be coupled to the male screw part 8824 that is disposed by passing through the tub 20.

In one embodiment, at a time when the tub connection duct 882 is fixed and fastened, as the fastening nut 886 is screw-coupled to the male screw part 8824, in the tub 20, the upper end part 8821 of the tub connection duct 882 may be fixed in the state of being exposed to the inside of the tub 20. A first gasket 885 may be further provided between the flange 8823 and the lower surface 25 of the tub 20 and prevent the loosening of the fastening nut 886 and the leakage of water.

As the tub connection duct 882 is fixed to the lower surface 25 of the tub 20 through the fastening nut 886. The sealing cap 884 may be coupled to the upper end part 8821 of the tub connection duct 882, exposed to the inside of the tub 20. At this time, an airtight ring 887 may be disposed between the sealing cap 884 and the upper end part 8821 of the tub connection duct 882 and prevent leakage of water.

Additionally, an upper suction opening 8826 into which external air is drawn may be formed in a penetrating manner, under the flange 8823 corresponding to the upper part of a filter accommodation space S1, between the upper end part 8821 and a lower end part 8822 of the tub connection duct 882.

In one embodiment, the upper suction opening 8826 may be formed in a way that penetrates from the inner circumferential surface of the tub connection duct 882 having a cylinder shape to the outer circumferential surface thereof. Preferably, the upper suction opening 8826 may be provided as a plurality of penetration openings that is arranged and formed along the circumferential direction of the tub connection duct 882.

Since the upper suction opening 8826 is formed along the circumferential direction of the tub connection duct 882 extending approximately in the perpendicular direction, the upper suction opening 8826 is open approximately in the horizontal direction, and external air drawn into the upper suction opening 8826 forms airflow having directionality approximately parallel with the horizontal direction.

At this time, the upper suction opening 8826, provided as a plurality of penetration openings to prevent deterioration in the strength of the tub connection duct 882, may be formed into a slit where an up-down height is less than a circumference-wise width.

In one embodiment, the plurality of penetration openings constituting the upper suction opening 8826 may respectively have an open area of the same size such that external air is drawn evenly along the circumferential direction.

The upper suction opening 8826 may be formed in a position higher than that of the upper opening of the filter 883 in the state where the filter 883 is disposed in the filter accommodation space S1. Accordingly, the upper suction opening 8826 may be formed between the tub 20 and the upper surface 8835 of the filter 883 with respect to the up-down direction.

As a result, external air having passed through the upper suction opening 8826 in a direction parallel with the horizontal direction may enter into the filter member 883, and then the airflow of the external air may change, and while the external air passes through an outer circumferential surface 8832 of the filter 883, the external air may be filtered.

In one embodiment, the filtering part 88 in the present disclosure may allow external air to flow into the filter 883 through tow suction paths comprising the lower suction opening 8812c and the upper suction opening 8826 that are spaced from each other along the up-down direction. Accordingly, a sufficient flow rate of dry airflow F required to dry a wash target may be ensured effectively.

The suction path of external air and the flow path of dry airflow having passed through the filter are described hereafter with reference to FIG. 10.

A fastening part 8825 may be integrally provided at the lower end part 8822 of the tub connection duct 882 and provide a detachable coupling function to the coupling opening 8811c of the first housing 8811. For example, the fastening part 8825 may be a fastening means that is coupled to the coupling opening 8811c of the first housing 8811, based on a hook-coupling method.

[Flow Path of Air Before and After Filtering]

Figure 9:
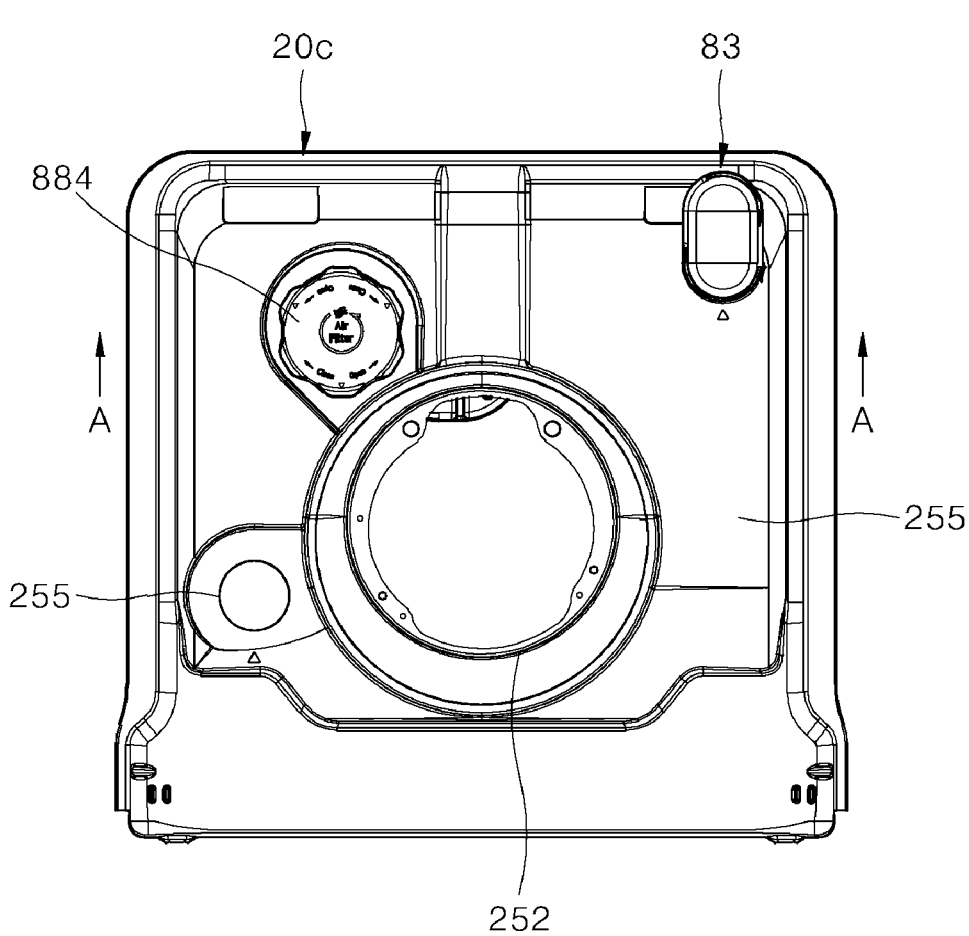
FIG. 9 is a plan view of FIG. 7.

FIG. 9 is a plan view of FIG. 7. FIG. 10 is a cross-sectional view along A-A in FIG. 9.

Hereafter, the flow path of external air before the external air passes through the filter 883 of the dishwasher 100 of one embodiment, and the flow path of dry airflow F after external air passes through the filter 883 and is filtered are described with reference to FIGS. 9 and 10.

The filter housing 881 of the dishwasher 100 of one embodiment is comprised of the first housing and the second housing that are spaced from each other in the up-down direction, and in the filter housing, external air is drawn through a plurality of suction openings that is open toward a space between the base 90 and the tub 20.

The plurality of suction openings, as described above, may comprise a upper suction opening 8826 that is provided at the tub connection duct 882, in the upper part of the filter accommodation space S1, and a lower suction opening 8812c that is provided on the bottom surface 8812e of the second housing 8812, in the lower part of the filter accommodation space S1.

The upper suction opening 8826 and the lower suction opening 8812c, as described above, may be respectively disposed at an uppermost position and a lowermost position of the filter housing 881 in the space between the tub 20 and the base 90 and spaced from each other. Accordingly, a sufficient flow rate of air required to dry a wash target may be ensured, and an increase in the drying time may be prevented since external air is drawn through the two suction openings in the state where the effect of the flow rates of air, drawn into the two suction openings, on the two suction openings is minimized.

The upper suction opening 8826, as illustrated, is open in a direction approximately parallel with the horizontal direction. Accordingly, external air drawn into the upper suction opening 8826 may form airflow having directionality parallel with the horizontal direction.

In one embodiment, the lower suction opening 8812c is formed on the bottom surface 8812e extending in the horizontal direction. Accordingly, the lower suction opening 8812c is open toward the base 90 in a direction parallel with the perpendicular direction, and external air drawn into the lower suction opening 8812c forms airflow in a direction parallel with the perpendicular direction.

The external air drawn through the upper suction opening 8826 may enter into the upper opening of the filter 883, which is disposed right under the upper suction opening 8826 in the state where the filter is disposed in the filter accommodation space S1.

Additionally, the external air drawn through the lower suction opening 8812c may enter into the lower opening of the filter 883, which is disposed right on the lower suction opening 8812c in the state where the filter 883 is disposed in the filter accommodation space S1.

In one embodiment, an airtight means may be provided at the upper end side of the filter 883 and the lower end side of the filter 883 in the state where the filter member 883 is disposed, and prevent non-filtered air from flowing into the filter housing 881. The airtight means may comprise a second gasket 8852 that is fixed to the coupling opening 8811c of the first housing 8811, and a pair of ring-shaped ribs 8812g that is provided around the lower suction opening 8812c of the second housing.

Accordingly, external air drawn into the upper suction opening 8826 and the lower suction opening 8812c may enter into the upper opening and the lower opening of the filter 883 respectively without leaking.

In one embodiment, in the state where the filter 883 is disposed in the filter accommodation space S1, the upper opening of the filter 883 is open toward the lower surface 25 of the tub 20, and the lower opening of the filter 883 is open toward the lower surface of the base 90. Thus, the direction of airflow of external air changes to the downward direction while the external air passes through the upper opening, and external air having passed through the lower opening flows upward.

The external air having flown into the filter 883, as described above, may be evenly drawn entirely in the up-down direction and the circumferential direction by passing through the filtering material of the filter 883.

In one embodiment, external air drawn into an inner circumferential surface 8831 of the filter 883 is filtered, and while passing through the outer circumferential surface 8832 of the filter 883, is discharged, and immediately after the external air is discharged, the flow direction of the external air changes.

As illustrated in FIG. 10, the flow direction of the filtered air having passed through the outer circumferential surface 8832 of the filter 883 may change toward the lower surface 824 of the fan housing 82, which is open toward the bottom surface 8812e of the filter housing 881.

In one embodiment, the lower surface 824 of the fan housing 82 is disposed between the lower end and the upper end of the filter 883 and spaced upward from the bottom surface 8812e. Accordingly, air, having passed through the filter 883 in a position higher than the position of the lower surface 824 of the fan housing 82, flows downward toward the lower surface 824 of the fan housing 82, and air, having passed through the filter 883 in a position lower than the position of the lower surface 824 of the fan housing 82, flows upward toward the lower surface 824 4 of the fan housing 82.

The filtered air drawn into the fan housing 82 through the above-described flow path is accelerated by a fan and then drawn into the housing connector 87 and the inner space of the heater housing 81 through an exhaust duct 822 to form dry airflow F.

FIG. 11 is a block diagram showing the dishwasher of one embodiment.

Referring to FIG. 11, the dishwasher 100 of one embodiment may comprise a water supply device 1110, a memory 1120, a door-automatic-opening module 352, a sensor part 1130, a speaker 1140, a display 33, a button part 34, a washing device 1150, a dry air supply part 80, a communication device 1170 and a processor 1160. The memory 1120 may include a non-transitory memory.

For example, the door-automatic-opening module 352 may comprise a driving motor 353, and the sensor part 1130 may comprise a first main sensor 1131, a second main sensor 132, and a sub sensor 1133. Additionally, the washing device 1150 may comprise a wash pump 54, a first nozzle 61, and a second nozzle 62. Further, the dry air supply part 80 may comprise an air blowing motor 89, a heater 84 and a temperature sensor 86.

The dishwasher 100 may control the on/off (ON/OFF) of the heater 84 to maintain the temperature of the heater 84 properly during the procedure in which tableware is dried with the door open (e.g., a door-open drying process).

The configuration of the dishwasher 100 in FIG. 11 is illustrated as an example, and components of the dishwasher 100 are limited to those in the illustrative embodiment of FIG. 11. When necessary, some components may be added, modified or removed.

In one embodiment, the water supply device 1110 may supply water into the dishwasher 100. The water supply device 1110 may comprise a water supply pipe 43 forming a water supply channel through which water is supplied from an external water source, and a water supply valve opening and closing the water supply channel formed at the water supply pipe 43.

In one embodiment, the memory 1120 may store control signals in relation to driving conditions and temporal conditions and the like for each procedure of the dishwasher 100. Additionally, the memory 1120 may store control signals for controlling the operations of the door-automatic-opening module 352, the display 33, the washing device 1150, the sensor part 1130, the speaker 1140, the communication device 1170, the dry air supply part 80 and the like.

In one embodiment, the memory 1120 may store at least one instruction with respect to each procedure (or an operation process; e.g., a washing process, a rinsing process, an additional rinsing process, a heating and rinsing process and a drying process) of the dishwasher 100. The memory 1120 may store a variety of programs for enabling the dishwasher 100 to operate, based on each procedure (or an operation process).

In one embodiment, information, data and a program and the like required for the operation of the dishwasher 100 may be stored in the memory 1120. Specifically, information on the procedures (e.g., a washing process, a rinsing process, an additional rinsing process, a heating and rinsing process, a drying process and the like) of the dishwasher 100 may be stored in advance in the memory 1120. The information may comprise information on operation time of each procedure. The information may comprise information on the order of operations based on each procedure.

In one embodiment, the drying process may comprise a hot air drying process where hot air is supplied to dry tableware, a door-open hot air drying process where the door is opened and then hot air is supplied to dry tableware, a door-open drying process where the door is opened to dry tableware, and a condensation drying process. The memory 1120 stores information, data and instructions required for the hot air dry, the door-open hot air dry, the door-open dry and the condensation dry.

In one embodiment, the memory 1120 may store a program executing instructions for controlling the operations of the dishwasher 100.

For example, the program may comprise instructions to identify whether the procedure of the dishwasher 100 enters into the door-open dry, and instructions to open the door 30 and operating the heater as the entry of the procedure of the dishwasher 100 into the door-open dry is identified.

Additionally, the program may comprise instructions to accumulate operation time of the air blowing fan 825, based on the operation of the air blowing fan 825, after the procedure of the dishwasher 100 enters into the door-open dry.

Further, the program may comprise instructions to output a notification (for example, an optical signal and/or an acoustic signal) for replacing a filter through at least one of the display 33 and the speaker 1140, in the case where total operation time accumulated based on the operation of the air blowing fan 825 is greater than predetermined first time, after the total operation time accumulated is compared with the predetermined first time (e.g., 1507 hours).

Further, the program may comprise instructions to initialize the total operation time accumulated in the memory 1120 and canceling the notification displayed on the display 33, in the case where the replacement of the filter 883 is identified.

Further, the program may comprise instructions to output a notification for replacing a filter 883 through at least one of the display 33 and the speaker 1140, in the case where the number of operation times of the air blowing fan 825 is accumulated in the memory 1120, based on the operations of the air blowing fan 825, and the number of accumulative times is greater than the number of predetermined times (e.g., 274 times) after the number of accumulative times is compared with the number of predetermined times.

Further, the program nay transmit information on replacement of the filter 883 to at least one of mobile terminals (e.g., a mobile terminal of a user of a dishwasher 100) through the communication device 1170.

Further, the program may cancel the notification displayed on the display 33 in at least one of the case where the replacement of the filter 883 is identified, and the case where the receipt of a signal indicating that the notification for replacing a filter 882 from at least one of the mobile terminals is canceled is identified.

In addition, the program may comprise instructions for the processor 1160 to control the operations of the dishwasher entirely.

In one embodiment, when receiving a control signal for opening the door 30 from the processor 1160 the door-automatic-opening module 352 may be driven electrically and open the door 30 in a rotating manner.

To this end, the door-automatic-opening module 352 may comprise a driving motor 353 generating a rotation driving power, a reduction gear part reducing the rotation driving power of the driving motor 353 and transforming the rotation driving power into a linear reciprocation driving power, and a push rod linearly reciprocating in the front-rear direction by using the linear reciprocation driving power.

In one embodiment, the sensor part 1130 may comprise a first main sensor 1131, a second main sensor 1132, and a sub sensor 1133 that sense the opening or closing of the door 30. Regarding the sensor part 1130, the first sensor 741 and the second sensor 742 may be disposed at the junction part of the main body of the dishwasher 100 in contact with the upper surface of the door 30, for example.

For example, the first main sensor 1131 and the second main sensor 1132 may comprise a microswitch that generates an on (ON) signal in the case where the door 30 is in a closing position, and generates and outputs an off (OFF) signal in the case where the door 30 escapes from the closing position.

To this end, the microswitch may be provided with a push button that remains pressed in the case where the door 30 is in the closing position, and is released from the press in the case where the door 30 escapes from the closing position. The microswitch may have an electric circuit therein, and the electric circuit generates an electric output signal comprising an on (ON) signal or an off (OFF) signal by detecting whether the push button is pressed.

For example, even if any one of the first main sensor 1131 and the second main sensor 1132 makes a functional error, or the door 30 is opened incompletely, the processor 1160 may identify the closing state or opening state of the door 30 accurately through any one of the first main sensor 1131 and the second main sensor 1132.

In one embodiment, the sub sensor 1133 may identify whether the door 30 reaches a forcible opening sensing position.

For example, the sub sensor 1133 may comprise a micro-switch that outputs an on (ON) signal in the case where the door 30 is between the closing position and the forcible opening sensing position, and outputs an off (OFF) signal in the case where the door 30 reaches the forcible opening sensing position.

However, unlike the first main sensor 1131 and the second main sensor 1132 that directly contact the door 30 and detect the position of the door, the sub sensor 1133 may indirectly detect the position of the door 30.

In one embodiment, the button part 34 may comprise a selection button to which a selection manipulation of the user is input, a power button to which a manipulation of the user is input for turning on/off (ON/OFF) the power of the dishwasher and the like. The button part 34 may comprise a power button, a selection button and the like. The processor 1160 may receive a signal of the user's control instruction (e.g., a power-on (ON) signal and a power-off (OFF) signal), a procedure signal and the like, through the button part 34.

In one embodiment, the speaker 1140 may output an alarm in relation to the operation time of the dishwasher 100, an alarm as to whether a wash is completed, and the like, as a voice or a sound, based on the operation state of the dishwasher 100, the replacement of the filter, the completion of the replacement of the filter, and whether the number of operation times of the air blowing fan 825 exceeds the number of predetermined times. The alarm output through the speaker 1140 may comprise an alarm that is based on the user's forcible opening or closing of the door 30.

In one embodiment, the speaker 1140 may output different sounds, depending on each step in a procedure, the activation or inactivation of a sensor (e.g., the first main sensor 1131, the second main sensor 1132, the sub sensor 1133, and the temperature sensor 86), a temporary stop of the procedure, the start or restart of the procedure, and the opening or closing of the door 30.

Additionally, the speaker 1140 may output a notification in relation to the replacement of the filter through the processor 1160.

Further, the speaker 1140 may output different alarms depending on various operations of the dishwasher 100 through the processor 1160.

In one embodiment, the washing device 1150 may supply wash water to the first nozzle 61 and the second nozzle 62 through the wash pump 45, to spray the wash water through the first nozzle 61 and the second nozzle 62.

Alternatively, the washing device 1150 may discharge water in the dishwasher 100 outward. The washing device 1150 may comprise a water discharge pipe 44 having a water discharge channel that guides water stored in the sump 41 to the outside. Additionally, the washing device 1150 may comprise a water discharge pump that is disposed on the water discharge channel formed in the water discharge pipe 44 and discharges wash water in the sump 41 outward though a water discharge motor.

In one embodiment, the dry air supply part 80 electrically connects to the air blowing motor 89, the heater 84, the filter 883, the air blowing fan 825 and the temperature sensor 86. For example, in the case where the door 30 is opened at least partially, the processor 1160 supplies power to the air blowing motor 89 and the heater 84 at the same time to supply high-temperature dry air, or cuts off a supply of power to the heater 84 and operates the air blowing motor 89 only to supply low-temperature dry air. The processor 1160 may identify whether dry air of a proper temperature is supplied and whether overheating occurs, based on an output signal (e.g., a single having sensed the temperature of the heater 84) of the temperature sensor 86, while high-temperature dry air is supplied.

In one embodiment, the display 33 may comprise a display panel, a light-emitting element and a touch sensor. The light-emitting element may be disposed around the touch sensor.

Additionally, the display 33 may display a notification in relation to the replacement of the filter 883 (e.g., an air filter), based on the operation of the air blowing fan.

The display panel may display various types of information on the entire operations of the dishwasher 100. The light-emitting element may output information on the availability or unavailability of a temporary stop. The touch sensor may sense an input for temporarily stopping a procedure of the dishwasher 100.

In one embodiment, the communication device 1170 may perform wire communication or wireless communication with at least one of the components included in the dishwasher 100. The communication device 1170 may comprise a router at home, a server, and at least one circuit that is capable of transmitting and receiving at least one signal or at least one piece of information through a network.

Additionally, the communication device 1170 may communicate with at least one another home appliance at home, based on the short-range communication (e.g., Bluetooth, near field communication (NFC), or a beacon). Alternatively, the communication device 1170 may perform wire communication or wireless communication with a mobile terminal or a server, through a network.

Further, the communication device 1170 may receive a signal or data from a mobile terminal and transmits the same to the mobile terminal. Based on the receipt and transmission of a signal or data with a mobile terminal, the dishwasher 100 may be controlled through an application of the mobile terminal, or information on the dishwasher 100 may be transmitted to the mobile terminal or a server, and the communication device 170 may receive a control signal from the mobile terminal or the server.

In one embodiment, the processor 1160 may load an instruction or data, received from the memory 1120, in the memory 1120, and process the same, and store the processed data in the memory 1120. Alternatively, the processor 1160 may display the processed data through the display 33.

In one embodiment, an artificial intelligence algorithm may be built into the processor 1160. Alternatively, the AI algorithm may be embodied by the processor 1160. As a program emulating the neural network of a human brain, AI may assist with a deep learning algorithm that analyzes, recognizes, infers and determines a variety of data on its own.

In one embodiment, when sensing an input for starting a procedure of the dishwasher 100, the processor 1160 may start a reservation operation for washing tableware inside of the dishwasher 100. The reservation operation may comprise a preprocessing process for operating the dishwasher 100, and a process of heating wash water.

In one embodiment, the processor 1160 turns on (ON) the air blowing motor 89 as the procedure of the dishwasher 100 falls into a drying process (e.g., the door-open drying process), and bases on the turn-on (ON) of the air blowing motor 89, the air blowing fan 825 starts to rotate.

In one embodiment, the processor 1160 may accumulate the operation time (e.g., operation time per drying process) for which the air blowing fan 825 operates, based on the operation of the air blowing fan 825, which starts as the dishwasher 100 starts a drying process, in the memory 1120.

For example, as the air blowing fan 825 starts to operate, the processor 1160 drives a timer 1161, and as the air blowing fan 825 stops operating, the processor 1160 may calculate the operation time for which the air blowing fan 825 has operated (e.g., the air blowing fan 825 has rotated), through the timer 1161 driven. Additionally, the processor 1160 may add the calculated operation time to total operation time (e.g., total operation time of the air blowing fan, in the previously performed drying process) stored in the memory 1120, and store the calculated operation time in the memory 1120.

In one embodiment, the processor 1160 may compare the total operation time, accumulated based on the operation of the air blowing fan 825, with predetermined first time (e.g., 1507 hours), and when the total accumulative operation time is the predetermined first time (e.g., 1507 hours) or greater, may output (e.g., display) a notification for replacing a filter 883 through the display 33.

Alternatively, when the total accumulative operation time is less than the predetermined time (e.g., 1507 hours), the processor 1160 may keep the notification in an off (OFF) or may not display a notification.

In one embodiment, the processor 1160 may output a notification for replacing a filter, through the speaker 1140.

In one embodiment, when the total accumulative operation time is the predetermined first time (e.g., 1507 hours) or greater, the processor 1160 may repeatedly output a notification through the display 33, in an on/off (ON/OFF) manner/mode.

For example, the processor 1160 may control the display 33 to repeat the process in which a notification is displayed on the display 33 and after predetermined time (e.g., a few ms), the notification is canceled (e.g., not displayed).

In one embodiment, when the time for which the notification is output repeatedly in an on/off (ON/OFF) manner/mode is predetermined second time (e.g., 24 hours) or greater, while repeatedly outputting the notification in an on/off (ON/OFF) manner/mode, the processor 1160 may output a notification for replacing a filter as a voice through the speaker 1140.

The processor 1160, as described above, may display the notification through the display 33 and output the notification through the speaker 1140 at the same time or may not at the same time.

In one embodiment, when the total accumulative operation time is the predetermined first time or greater, the processor 1160 may transmit information on the replacement of the filter 883 to at least one mobile terminal through the communication device 1170. The information may be transmitted to a server through a router at home, and the server may receive the information and transmit the same to the mobile terminal.

In one embodiment, the processor 1160 may generate information comprising filter replacement messages containing different particulars, depending on the magnitude of total accumulative operation time.

For example, when the total accumulative operation time accounts for 77% of the predetermined first time, the information may include a filter replacement message (e.g., OO, time to replace the filter. Prepare a new filter).

For example, when the total accumulative operation time is the predetermined first time or greater, the information may include a filter replacement message (e.g., OO, replace the filter).

In one embodiment, when identifying that the filter 883 is replaced, the processor 1160 may initialize the total operation time of the air blowing fan 825, which is accumulated in the memory 1120, and cancel the notification displayed on the display 33.

In one embodiment, when identifying that the filter 883 is replaced or that the operation time of the air blowing fan 825 is initialized by the user, the processor 1160 may initialize the total operation time of the air blowing fan 825, accumulated in the memory 1120, to 0.

In one embodiment, when identifying that the dishwasher 100 is currently performing a drying process, based on the dry air supply part 80, the processor 1160 may output a notification in an on (ON) manner through the display 33, during the drying process. The notification includes an optical signal and/or an acoustic signal to output to a customer.

In one embodiment, when identifying that the dishwasher 100 is not performing a drying process currently and the total operation time of the air blowing fan 825 is the predetermined first time (e.g.: 1507 hours) or greater, the processor 1160 may repeatedly output a notification through the display 33, in an on/off (ON/OFF) manner/mode.

In one embodiment, the processor 1160 may control the display 33 to output a notification in a different manner, depending on the case where the dishwasher 100 is currently performing a drying process that is based on the operation of the air blowing fan 825, in the state where the total accumulative operation time is the predetermined first time (e.g.: 1507 hours) or greater, or the case where the dishwasher 100 is performing a procedure that is not based on the operation of the air blowing fan 825.

In one embodiment, the processor 1160 may count how many times the dishwasher 100 performs a drying process based on the operations of the air blowing fan 825, and when the number of counted times is the number of predetermined times (e.g., 274 times) or greater, may output a notification for replacing a filter 883 through the display 33.

In one embodiment, the processor 1160 may transmit information on the replacement of the filter 883 to at least one mobile terminal through the communication device 1170. When identifying that the filter 883 needs to be replaced, the processor 1160 may transmit information on the replacement of the filter (e.g., a filter replacement notification message, a filter shopping site, a filter price and the like) to a user of the dishwasher 100. To this end, the memory 1120 may store a mobile phone number of a user who uses or manages the dishwasher 100.

In one embodiment, when identifying that the filter 883 is replaced or that a signal indicating a notification for replacing a filter 883 is canceled is received by at least one mobile terminal, the processor 1160 may cancel (e.g., turn off) the notification displayed on the display 33.

In one embodiment, the processor 1160 may control the display 33 such that the notification becomes read gradually, as the number of accumulative times regarding the use of the filter 883 increases.

For example, when the number of accumulative times is 100 times or greater, the processor 1160 may display a notification as yellow, when the number of accumulative times is 200 times or greater, display a notification as orange, and when the number of accumulative times is 272 times or greater, display a notification as red.

Figure 12:
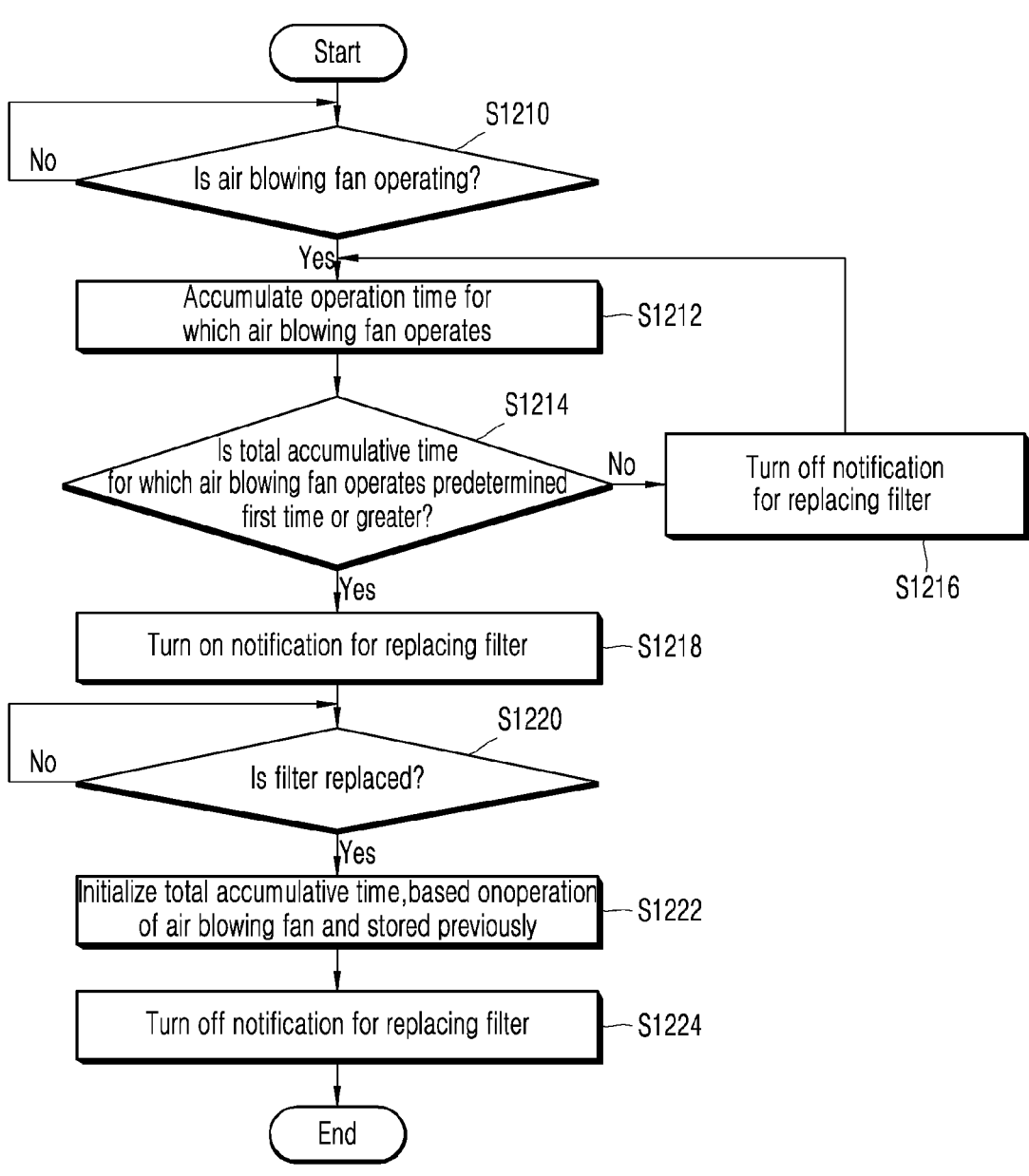
FIG. 12 is a flow chart showing the process in which the dishwasher of one embodiment provides a notification for replacing a filter.
Figure 13:
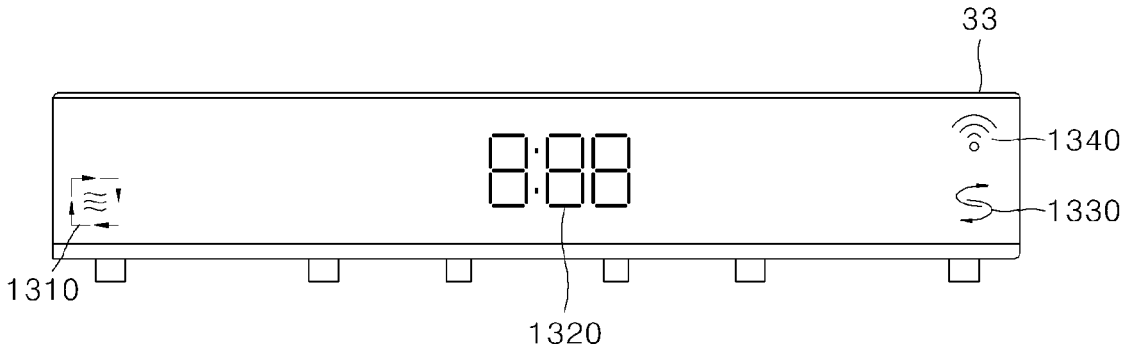
FIG. 13 is a view showing an example of a notification that is displayed on a display of the dishwasher of one embodiment.

FIG. 12 is a flow chart showing the process in which the dishwasher of one embodiment provides a notification for replacing a filter. FIG. 13 is a view showing an example of a notification that is displayed on a display of the dishwasher of one embodiment.

Hereafter, the process in which the dishwasher of one embodiment provides a notification for replacing a filter is described as follows, with reference to FIGS. 12 and 13.

In one embodiment, the processor 1160 may identify whether the air blowing fan operates (S1210). As an instruction to turn on (ON) the operation of the dishwasher 100 is input through the button part 34, the processor 1160 may operate the dishwasher 100, based on the logic regarding pre-set procedures (or operation processes; e.g., a washing process, a rinsing process, an additional rinsing process, a heating and rinsing process, a drying process and the like).

In these procedures, the drying process may comprise a hot air drying process where hot air is supplied to dry tableware, a door-open hot air drying process where the door is opened and then hot air is supplied to dry tableware, a door-open drying process where the door is opened to dry tableware, and a condensation drying process.

The processor 1160 may identify at least one drying process in need of operation of the air blowing fan 825, among the drying processes. Then the processor 1160 may operate the air blowing motor 89 to rotate the air blowing fan 825.

In one embodiment, as the examination of the load state is completed, the processor 1160 may turn on (ON) the air blowing motor 89, and identify whether the air blowing motor 89 operates normally or not.

For example, the processor 1160 may determine that the air blowing motor 89 and the air blowing fan 825 operate normally, in the case where the air blowing fan 825 rotates based on the processor 1160's identification as to whether the air blowing fan 825 rotates or not, through a sensor (e.g., a Hall sensor) sensing the operation of the air blowing fan 825.

If the processor 1160 determines that the air blowing fan 825 does not rotate, predetermined times (e.g., three times) or greater, the processor 1160 may determine that the air blowing motor 89 fails to operate.

In one embodiment, the processor 1160 may calculate the operation time for which the air blowing fan operates, and accumulate the operation time (S1212). As the air blowing fan 825 rotates, the processor 1160 may calculate the time for which the air blowing fan 825 operates, through the timer 1161.

Alternatively, the processor 1160 may estimate the time for which the air blowing fan 825 operates, based on the time for which power is supplied to the air blowing motor 89.

Additionally, the processor 1160 may accumulate the time for which the air blowing fan 825 operates, in the memory 1120.

In one embodiment, the processor 1160 may identify whether the total accumulative time for which the air blowing fan has operated is predetermined first time or greater (S1214). The processor 1160 may accumulate the operation time, each time the air blowing fan 825 operates, and to identify whether the accumulative time (i.e., the total time for which the air blowing fan 825 has operated) is the predetermined first time (e.g., 1507 hours) or greater, may compare the magnitude of the accumulative time with the magnitude of the predetermined first time.

In one embodiment, the processor 1160 may keep a notification for replacing a filter off (OFF) (S1216). Unless the accumulative time is the predetermined first time (e.g., 1507 hours) or greater, the processor 1160 may determine that it is not time to replace the filter 883, and keep the notification for replacing a filter off (OFF).

In one embodiment, in the state where the notification for replacing a filter remains on (ON), the processor 1160 may change the on-state of the notification for replacing a filter to the off (OFF)-state thereof after the filter is replaced.

In one embodiment, the processor 1160 may turn on (ON) the notification for replacing a filter (S1218). The processor 1160 may determine that the filter 883 needs to be replaced, and turn on (ON) the notification for replacing a filter on the display 33, in the case where the dishwasher 100 is currently performing the drying process, and the accumulative time is the predetermine first time (e.g., 1507 hours) or greater.

In one embodiment, the processor 1160 may repeatedly output a notification through the display 33, in an on/off (ON/OFF) manner/mode, in the case where the dishwasher 100 is not currently performing a drying process (i.e., the dishwasher 100 is performing another process rather than the drying process, or is not operating), and the total accumulative operation time is the predetermined first time or greater.

In one embodiment, when identifying that the dishwasher 100 is currently performing the drying process, the processor 1160 may output a notification through the display 33 in an on (ON) manner while the drying process is performed.

Alternatively, in the case where the processor identifies that the dishwasher 100 is not currently performing the drying process, and the total accumulative operation time is the predetermined first time or greater, the processor 1160 may repeatedly output the notification through the display 33, in an on/off (ON/OFF) manner/mode.

Additionally, the processor 1160 may transmit the notification for replacing a filter to an application (e.g., the LG ThinQ™ application) installed in a mobile terminal, through the communication device 1170.

Referring to FIG. 13, the processor 1160 may display a notification 1310 for replacing a filter on the display 33. The display 33 may display the notification 1310 indicating that the filter 883 needs to be replaced, at the lower part of the left side thereof (or another part). The notification 1310 may be displayed in the case where the dishwasher 100 is currently performing the drying process, and the filter needs to be replaced (a first display). Alternatively, the notification 1310 may be displayed even in the case where the dishwasher 100 is not currently performing the drying process, and the filter needs to be replaced (a second display).

For example, the first display may involve keeping notification 1310 on (ON), and the second display may involve repeatedly displaying the notification 1310 in an on (ON) manner and in an off (OFF) manner/mode. The notification 1310 may be a filter replacement notification display, or at a time of drying, may be an operation notification display. Additionally, the notification 1310 may have a rectangle shape, the center of each side may separate, and a tilde may be included in the rectangle shape.

In the present disclosure, the notification is displayed as shown in FIG. 13, but is illustrated as an example. A notification of another shape or type may be displayed.

Additionally, the display 33 may comprise a time display 1320 displaying the operation time of the dishwasher 100, a communication display 1340 displaying a connection to a communication network (e.g., Wi-Fi), and a salt complement notification display 1330 displaying an amount of the remaining salt in the dishwasher 100.

In one embodiment, in the case where total accumulative operation time is predetermined first time or greater, the processor 1160 may output a notification for replacing a filter through the speaker 1140. Alternatively, in the case where the total accumulative operation time is the predetermined first time or greater, the processor 1160 may output the notification for replacing a filter through the speaker 1140, after predetermined time (e.g., 24 hours) passes. For example, the notification may be a voice message (e.g., Replace the filter).

In one embodiment, the processor 1160 may identify that the filter is replaced (S1220). The processor 1160 may determine that the existing filter is detached and a now filter is attached, through a sensor, and identify that the filter is replaced.

Alternatively, the processor 1160 may identify the replacement of the existing filter, after the filter is replaced, as the user initializes the accumulative time regarding the use of the filter.

In one embodiment, the processor 1160 may initialize the total accumulative time that is stored previously in relation to the air blowing fan (S1222). When determining that the existing filter is detached and a new filter is attached, the processor 1160 may initialize the operation time of the air blowing fan 825 stored in the memory 1120. Alternatively, when determining that the user's instruction to initialize the accumulative time in relation to the use of the existing filter is input, the processor 1160 may initialize the operation time of the air blowing fan 825, which is stored in the memory 1120.

In one embodiment, the processor 1160 may turn off (OFF) the notification for replacing a filter (S1224). When a new filter is attached while the existing filter is detached, the processor 1160 may turn off (OFF) or cancel the notification for replacing a filter, displayed on the display 33. Alternatively, when determining that the user's instruction to initialize the accumulative time in relation to the use of the existing filter is input, the processor 1160 may turn off (OFF) or cancel the notification for replacing a filter, displayed on the display 33.

Figure 14:
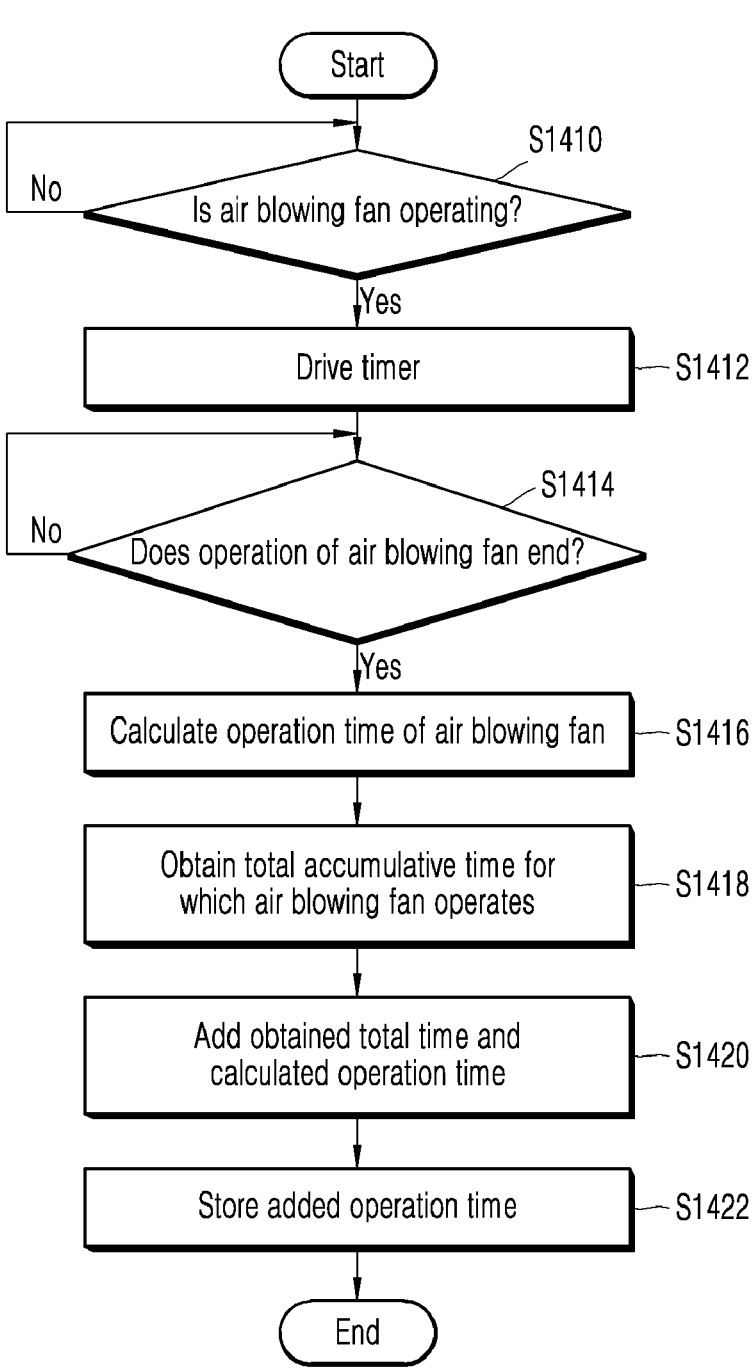
FIG. 14 is a flow chart showing the process in which operation time is accumulated, based on an operation of an air blowing fan of one embodiment.

FIG. 14 is a flow chart showing the process in which operation time is accumulated, based on an operation of an air blowing fan of one embodiment.

Hereafter, the process in which the operation time is accumulated, based on the operation of the air blowing fan of one embodiment is described as follows with reference to FIG. 14.

In one embodiment, the processor 1160 may identify whether the air blowing fan operates (S1410). As an instruction to turn on (ON) the operation of the dishwasher 100 is input through the button part 34, the processor 1160 may operate the dishwasher 100, based on the logic regarding pre-set procedures.

In one embodiment, the processor 1160 may identify a drying process (e.g., a door-open drying process) in need of the operation of the air blowing fan 825, among drying processes. Then the processor 1160 may operate the air blowing motor 89 to rotate the air blowing fan 825.

When determining that the operation of the air blowing fan 825 is needed, the processor 1160 may supply voltage to the air blowing motor 89 to rotate the air blowing fan 825.

Additionally, the processor 1160 may identify the operation of the air blowing fan 825, based on the rotation of the air blowing fan 825.

In one embodiment, the processor 1160 may drive a timer (S1412). When identifying that the air blowing fan 825 rotates (or identifying that the air blowing motor 89 does not fail), the processor 1160 may drive the timer 1161.

In one embodiment, the processor 1160 may identify whether the operation of the air blowing fan ends (S1414). When the drying process (e.g., the door-open drying process) ends, the processor 1160 may cut off a supply of voltage to the air blowing motor 89 to end the operation of the air blowing fan 825, In one embodiment, the processor 1160 may calculate the operation time of the air blowing fan (S1416). The processor 1160 may calculate the operation time of the air blowing fan, based on the drying process (e.g., the door-open drying process), through the timer 1161.

In one embodiment, the processor 1160 may obtain total accumulative time for which the air blowing fan has operated (S1418). The processor 1160 may obtain the accumulative operation time for which the air blowing fan 825 operates previously (i.e., the operation time of the air blowing fan 825 after the filter 883 is mounted) from the memory 1120.

In one embodiment, the processor 1160 may add the total time obtained and the operation time calculated (S1420). The processor 1160 may add the operation time calculated in step 1412 to step 1416), and the total time obtained in step 1418. For example, the processor 1160 may add the accumulative time for which the air blowing fan 825 operated in the past, and current operation time (S1410).

In one embodiment, the processor 1160 may store the operation time added (S1422). The processor 1160 may add the operation time calculated in step 1412 to step 1416, and the total time obtained in step S1418, and store the same in the memory 1120.

Figure 15:
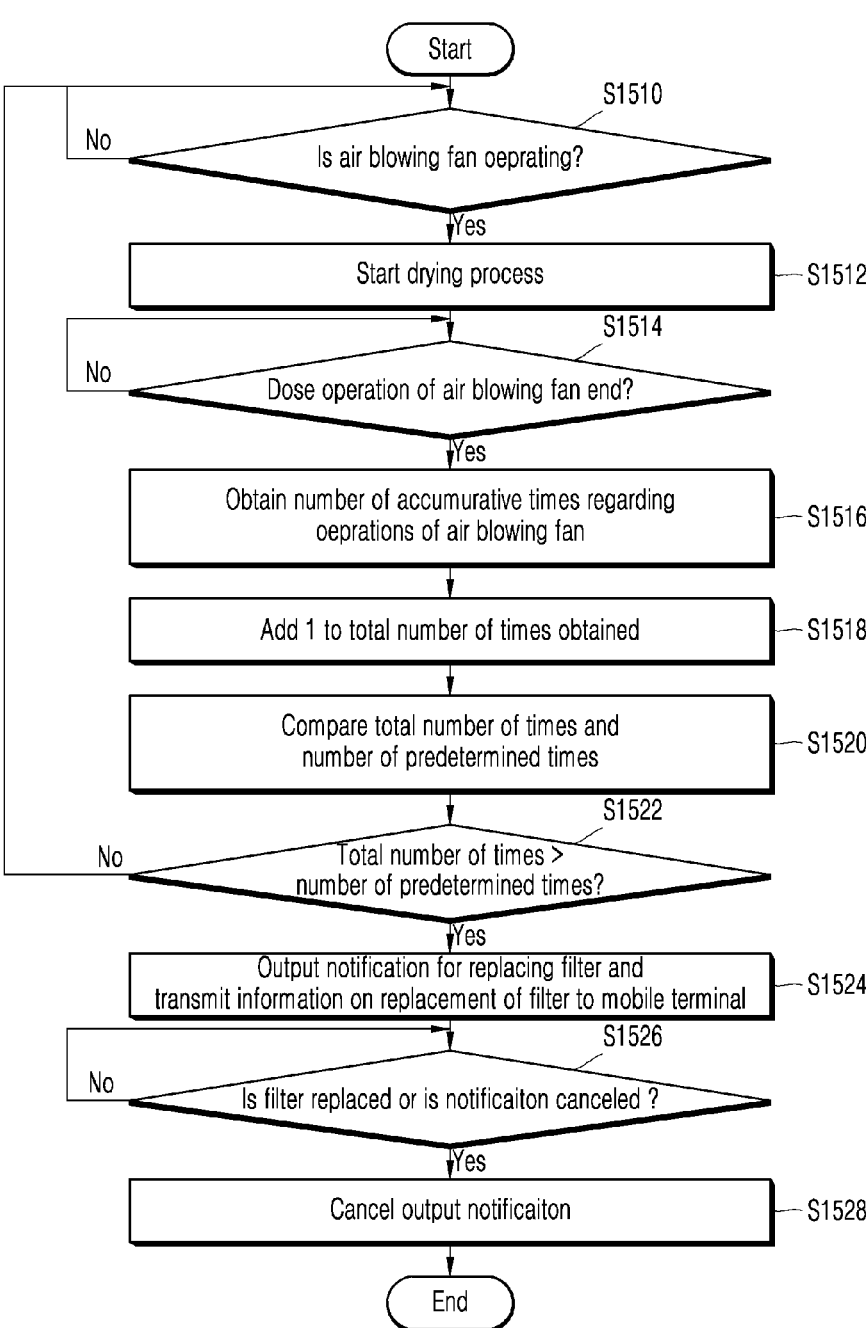
FIG. 15 is a flow chart showing the process in which the dishwasher of one embodiment provides a notification for replacing a filter.

FIG. 15 is a flow chart showing the process in which the dishwasher of one embodiment provides a notification for replacing a filter.

Hereafter, the process in which the dishwasher of one embodiment provides the notification for replacing a filter is described as follows, with reference to FIG. 15.

In one embodiment, the processor 1160 may identify whether the air blowing fan operates (S1510). When an instruction to turn on (ON) the operation of the dishwasher 100 is input through the button part 34, the processor 1160 may operate the dishwasher 100, based on the logic regarding predetermined procedures. Alternatively, when identifying a drying process (e.g., the door-open drying process) in need of the operation of the air blowing fan 825, among drying processes, the processor 1160 may operate the air blowing motor 89 to rotate the air blowing fan 825.

In one embodiment, the processor 1160 may start a drying process (S1512). The processor 1160 may operate the dishwasher 100 and determine whether the drying process starts, based on the logic regarding predetermined procedures.

In one embodiment, the processor 1160 may identify whether the operation of the air blowing fan ends (S1514). When the drying process (e.g., the door-open drying process) ends, the processor 1160 may cut off a supply of voltage to the air blowing motor 89 to end the operation of the air blowing fan 825.

In one embodiment, the processor 1160 may obtain the number of accumulative times based on the operations of the air blowing fan (S1516). As the operation of the air blowing fan 825 ends, the processor 1160 may count the number of operation times of the air blowing fan 825 as 1.

In one embodiment, the processor 1160 may add 1 to the total number of times obtained (S1518). The processor 1160 may add 1 counted in step 1516 to the number of accumulative times based on the operation of the air blowing fan.

In one embodiment, the processor 1160 may compare the number of added times with the number of predetermined times (S1520). The processor 1160 may compare the number of times added in step 1518 with the number of predetermined times (e.g., 274 times) stored in the memory 1120.

In one embodiment, the processor 1160 may identify whether the number of added times is greater than the number of predetermined times (S1522). The processor 1160 may identify whether the number of added times is greater than the number of predetermined times (e.g., 274 times).

In one embodiment, the processor 1160 may output a notification for replacing a filter, and transmit information on replacement of a filter to a mobile terminal (S1524). In the case where the number of added times exceeds the number of predetermined times (e.g., 274 times), the processor 1160 may determine that the filter 883 needs to be replaced, and transmit information on replacement of a filter to a mobile terminal. The information may comprise a filter replacement notification message, a filter shopping site, a filter price and the like. Additionally, the processor 1160 may turn on (ON) the notification for replacing a filter, on the display 33.

In one embodiment, when identifying that the number of total accumulative times exceeds the number of predetermined times (e.g., 274 times), the processor 1160 may repeatedly output a notification through the display 33, in an on/off (ON/OFF) manner/mode.

The processor 1160 may output a notification through the display 33 in an on (ON) manner, during the drying process.

Additionally, the processor 1160 may transmit the notification for replacing a filter to an application (e.g., the LG ThinQ™ application) installed in a mobile terminal, through the communication device 1170.

In one embodiment, the processor 1160 may identify whether the notification for replacing a filter is canceled (S1526). The processor 1160 may determine whether the existing filter is detached and a new filter is attached, through a sensor, to identify the replacement of the filter.

Alternatively, the processor 1160 may identify the replacement of the existing filter, as the user initializes accumulative time regarding the use of the filter, after the filter is replaced.

Alternatively, the processor 1160 may obtain a notification cancelation signal (that is received) from the communication device 1170. The notification cancelation signal is a signal that is generated based on a request for canceling the notification, which is made by the user of a mobile terminal through an application (e.g., the LG ThinQ application).

In one embodiment, the processor 1160 may cancel the output notification (S1528). When determining that the existing filter is detached and a new filter is attached, the processor 1160 may cancel the notification output on the display 33. Further, when receiving a signal that is generated based on a request for canceling the notification, from a mobile terminal, the processor 1160 may cancel the notification output on the display 33.

Figure 16:
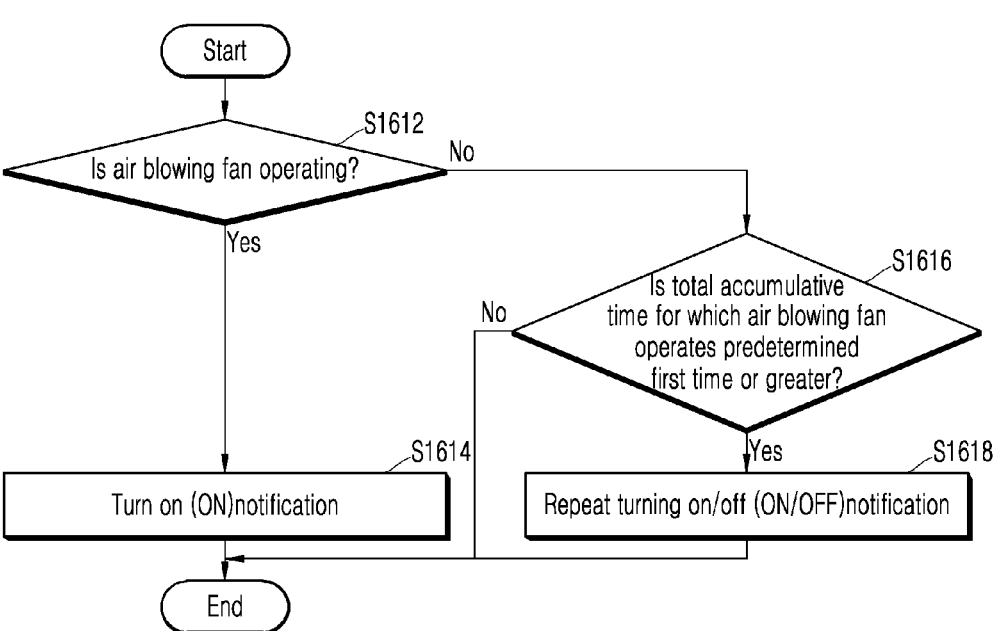
FIG. 16 is a flow chart showing the process in which a notification is displayed differently, based on an operation of the air blowing fan of the dishwasher of one embodiment.

FIG. 16 is a flow chart showing the process in which a notification is displayed differently, based on an operation of the air blowing fan of the dishwasher of one embodiment.

Hereafter, the process in which a notification is displayed differently, based on an operation of the air blowing fan of the dishwasher of one embodiment, is described as follows, with reference to FIG. 16.

In one embodiment, the processor 1160 may identify whether the air blowing fan of the dishwasher 100 is operating (S1610). The processor 1160 may identify whether the air blowing fan 825 is operating or not, based on a procedure that is being currently performed by the dishwasher 100.

In one embodiment, the processor 1160 may turn on (ON) the notification, in the case where the air blowing fan 825 is operating (S1612). For example, the processor 1160 may control the display 33 such that the notification remains on (ON) in the case where the air blowing fan 825 is operating.

In one embodiment, in the case where total accumulative time for which the air blowing fan 825 has operated is predetermined first time or greater, or is not, the notification may remain on (ON) as long as the air blowing fan 825 is operating.

In one embodiment, when identifying that the air blowing fan is not operating, the processor 1160 may determine whether the total accumulative time for which the air blowing fan has operated is the predetermined first time or greater (S1614). In the case where the air blowing fan 825 is not operating, the processor 1160 may determine whether the total accumulative time is the predetermined first time or greater, to display the notification in a different manner.

In one embodiment, the processor 1160 may repeat turning on/off (ON/OFF) the notification (S1616). In the case where the air blowing fan 825 is not operating, and the total accumulative time for which the air blowing fan 825 has operated is the predetermined first time or greater, the processor 1160 may repeat turning on/off (ON/OFF) the notification 1310.

Alternatively, in the case where the processor 1160 identifies that the air blowing fan 825 is not operating, and the total accumulative time for which the air blowing fan 825 has operated is less than the predetermined first time or greater, the processor 1160 may keep the notification for replacing a filter 1310 off (OFF).

The number of times and the time, indicated by numerical values in the present disclosure, are provided as examples and may be adjusted, and the number of times and the time in the embodiments of the present disclosure are not limited.

Each of the steps in each of the flowcharts, described above, may be performed regardless of order illustrated in the flowcharts, or performed at the same time. Further, in the present disclosure, at least one of the components, and at least one of the operations performed by at least one of the components can be embodied as hardware and/or software.

The embodiments are described above with reference to a number of illustrative embodiments thereof. However, embodiments are not limited to the embodiments and drawings set forth herein, and numerous other modifications and embodiments can be made by one skilled in the art within the technical scope of the disclosure. Further, the effects and predictable effects based on the configurations in the disclosure are to be included within the scope of the disclosure though not explicitly described in the description of the embodiments.

What is claimed is:

1. A dishwasher comprising:
a tub that defines a wash space therein;
a door configured to open and close the wash space;
a dry air supply part comprising an air blowing fan and a filter;

a non-transitory memory; and
a processor configured to control operation of the dishwasher,
wherein the processor is configured to:
accumulate, in the non-transitory memory, (i) an operation time for which the air blowing fan operates and (ii) a number of times of a drying process based on operation of the air blowing fan,
perform (i) a comparison of a total accumulative operation time of the air blowing fan accumulated in the non-transitory memory based on the operation of the air blowing fan with a predetermined first time and (ii) a comparison of the number of times of the drying process with a number of predetermined times,
output at least one of an optical signal or an acoustic signal to notify a user to replace the filter based on at least one of (i) the total accumulative operation time being greater than or equal to the predetermined first time or (ii) the number of times of the drying process being greater than or equal to the predetermined times, and
based on the filter being replaced, initialize the total accumulative operation time and the number of times of the drying process, and stop outputting the at least one of the optical signal or the acoustic signal.

2. The dishwasher of claim 1, wherein when identifying that the dishwasher is currently performing the drying process based on the dry air supply part, the processor is configured to output the at least one of the optical signal or the acoustic signal to the user, during the drying process.

3. The dishwasher of claim 1, wherein the dishwasher further comprises a display,
wherein the display is configured to indicate a notification for replacing the filter when the dishwasher is currently performing the drying process.

4. The dishwasher of claim 3, wherein the display is configured to indicate the notification when the dishwasher is currently performing another process including a cleaning process and a ringing process, or when the dishwasher is operating the air blowing fan.

5. The dishwasher of claim 1, wherein when the total accumulative operation time is less than the predetermined first time, the processor is configured to keep a notification in an off mode.

6. The dishwasher of claim 1, wherein the processor is configured to:
detect an initialization signal of the total accumulative operation time from the user; and
initialize the total accumulative operation time in the non-transitory memory, based on a detection of the initialization signal.

7. The dishwasher of claim 1, wherein the processor is configured to:
drive a timer, as the air blowing fan starts to operate;
calculate the operation time of the air blowing fan based on a driven time of the timer, as the air blowing fan stops operating;
add the calculated operation time to the total accumulative operation time stored in the non-transitory memory; and
store the added total accumulative operation time in the non-transitory memory.

8. The dishwasher of claim 1, further comprising a speaker, wherein the processor is configured to control the speaker to output a notification for replacing the filter through the speaker.

9. The dishwasher of claim 1, further comprising a communication device, wherein the processor is configured to transmit information for replacing of the filter to at least one mobile terminal through the communication device when the total accumulative operation time is the predetermined first time or greater.

10. The dishwasher of claim 1, wherein the processor is configured to, in a state where the total accumulative operation time is greater than or equal to the predetermined first time, control a display to output a notification in a different manner, depending on (i) a case in which the dishwasher is currently performing a drying process that is based on an operation of the air blowing fan, or (ii) a case in which the dishwasher is current performing a procedure that is not based on an operation of the air blowing fan.

11. The dishwasher of claim 1, wherein the dry air supply part further comprises a tub connection duct connected to a filter replacement hole of the tub.

12. A dishwasher, comprising:

a dry air supply part comprising an air blowing fan and a filter;

a communication device;

a non-transitory memory; and a processor configured to control operation of the dishwasher, wherein the processor is configured to:

accumulate, in the non-transitory memory, (i) an operation time for which the air blowing fan operates and (ii) a number of times of a drying process based on operation of the air blowing fan, perform (i) a comparison of a total accumulative operation time of the air blowing fan accumulated in the non-transitory memory based on the operation of the air blowing fan to a with a predetermined first time and (ii) a comparison of the number of times of the drying process with a number of predetermined times, output at least one of an optical signal or an acoustic signal to notify a user to replace the filter based on at least one of (i) the total accumulative operation time being greater than or equal to the predetermined first time or (ii) the number of times of the drying process being greater than or equal to the predetermined times, and based on the filter being replaced, initialize the total accumulative operation time and the number of times of the drying process, and stop outputting the at least one of the optical signal or the acoustic signal.

13. The dishwasher of claim 12, further comprising a display, wherein the processor is configured to control the display to display the optical signal in red based on an increase of an accumulated number of operation times of the air blowing fan.

14. The dishwasher of claim 12, further comprising a display, wherein the processor is configured to stop outputting the at least one of the optical signal or the acoustic signal based on receiving, from at least one mobile terminal, a signal indicating at least one of (i) initialization of a total operation period of the air blowing fan, (ii) initialization of the accumulated number of the operation times, or (iii) cancelation of a notification for replacing the filter.

15. A method for providing a notification for replacing a filter of a dishwasher, the method comprising:

accumulating (i) an operation time for which an air blowing fan operates and (ii) a number of times of a drying process based on operation of the air blowing fan;

performing (i) a comparison of a total accumulative operation time of the air blowing fan accumulated based on the operation of the air blowing fan with a predetermined first time and (ii) a comparison of the number of times of the drying process with a number of predetermined times;

outputting at least one of an optical signal or an acoustic signal to notify a user to replace the filter based on at least one of (i) the total accumulative operation time being greater than or equal to the predetermined first time or (ii) the number of times of the drying process being greater than or equal to the predetermined time; and based on the filter being replaced, initializing the total accumulative operation time and the number of times of the drying process, and stopping output of the at least one of the optical signal or the acoustic signal.

16. The method of claim 15, wherein outputting the at least one of the optical signal or the acoustic signal comprises:

outputting the at least one of the optical signal or the acoustic signal to the user, during the drying process.

17. The method of claim 15, wherein outputting the at least one of the optical signal or the acoustic signal comprises:

keeping the notification in an off mode.

18. The method of claim 15, wherein outputting the at least one of the optical signal or the acoustic signal comprises:

transmitting the notification for replacing the filter to at least one mobile terminal.

* * * * *